Jan. 20, 1948.  G. T. RANDOL  2,434,717
POWER DRIVE CONTROL SYSTEM
Filed Dec. 10, 1941  15 Sheets-Sheet 1
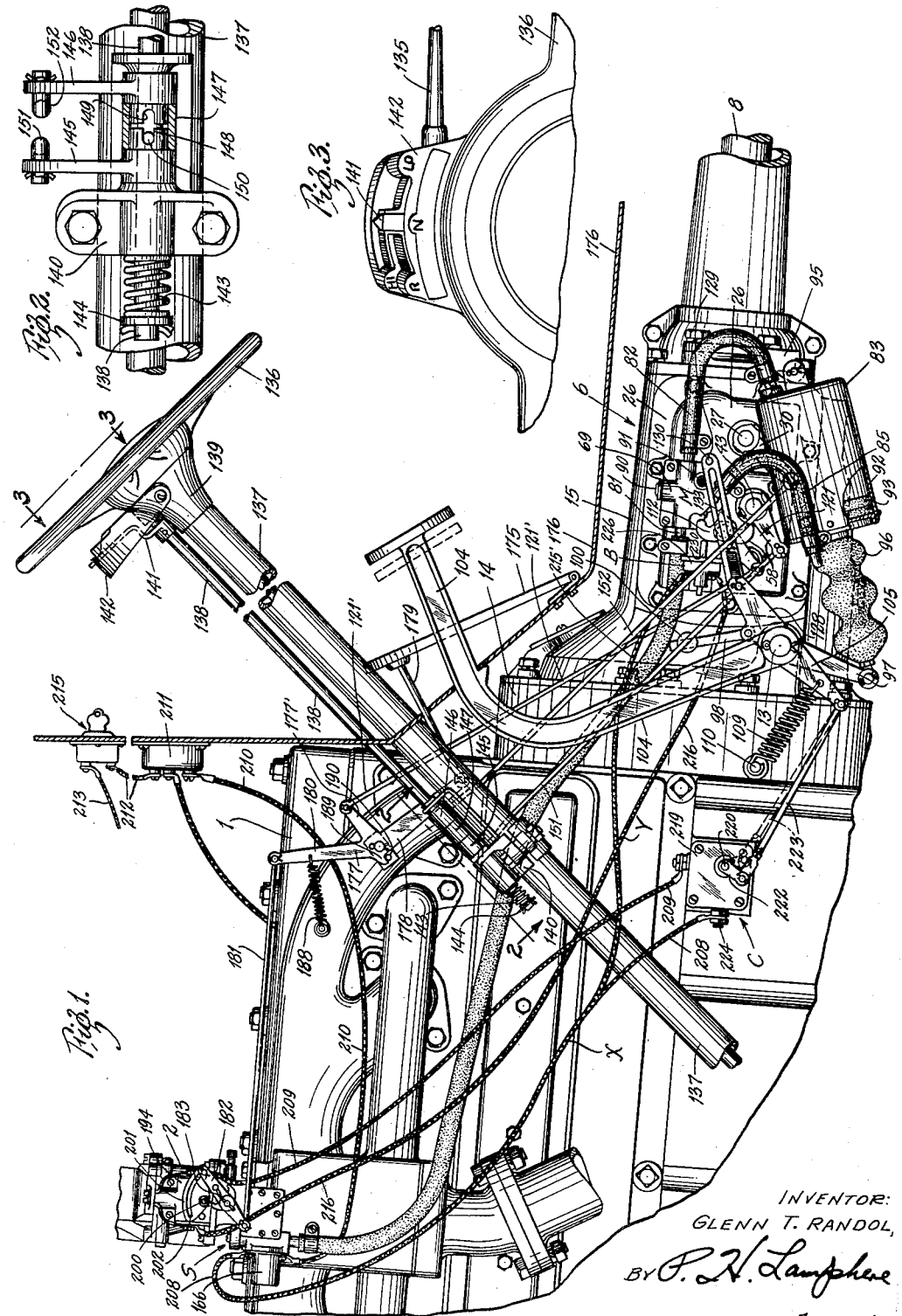
INVENTOR:
GLENN T. RANDOL,
BY P. H. Lamphere
ATTORNEY.

Jan. 20, 1948.    G. T. RANDOL    2,434,717
POWER DRIVE CONTROL SYSTEM
Filed Dec. 10, 1941    15 Sheets-Sheet 2

INVENTOR:
GLENN T. RANDOL,
BY P. H. Lamphere
ATTORNEY.

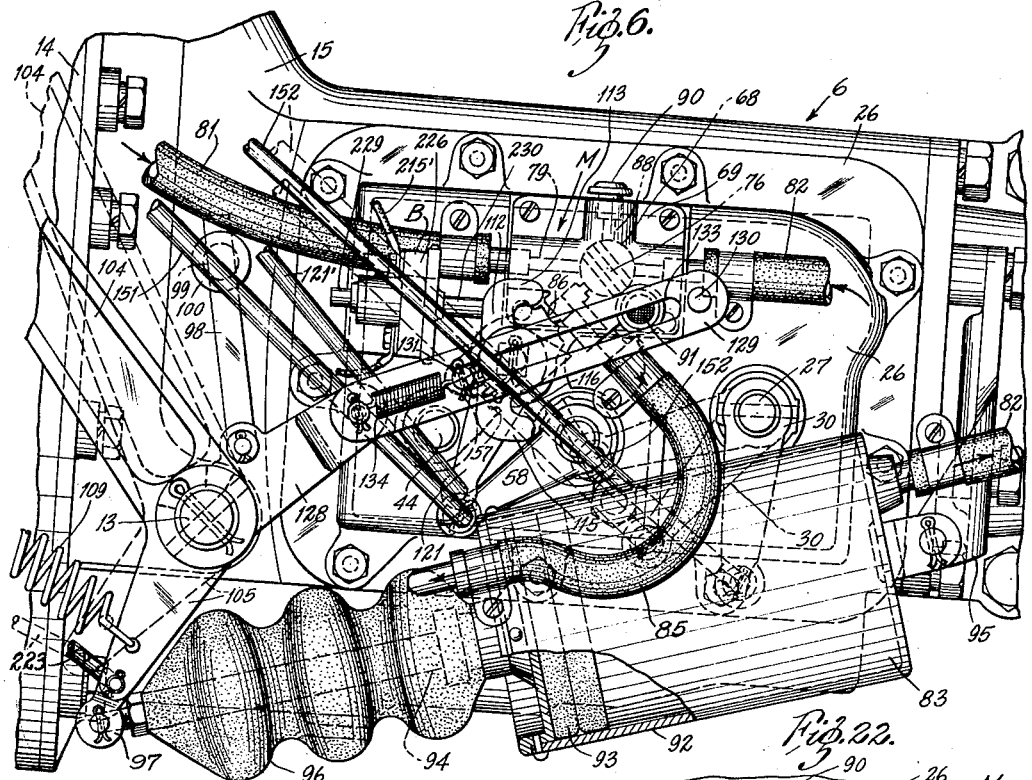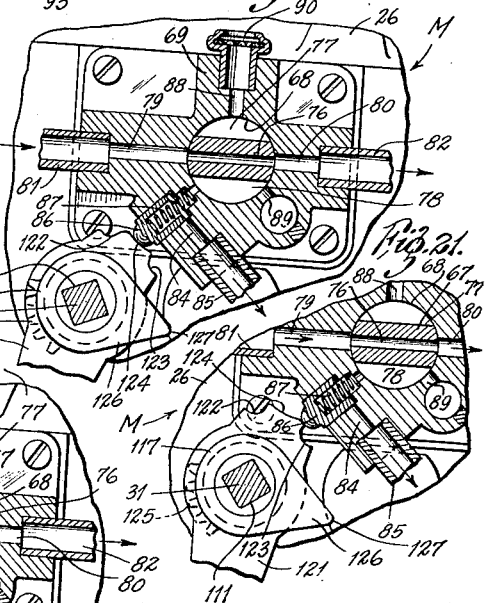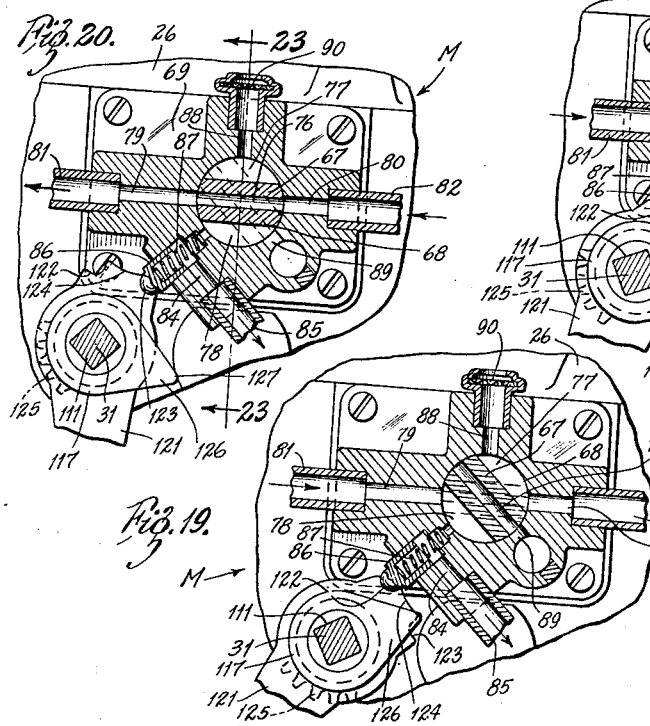

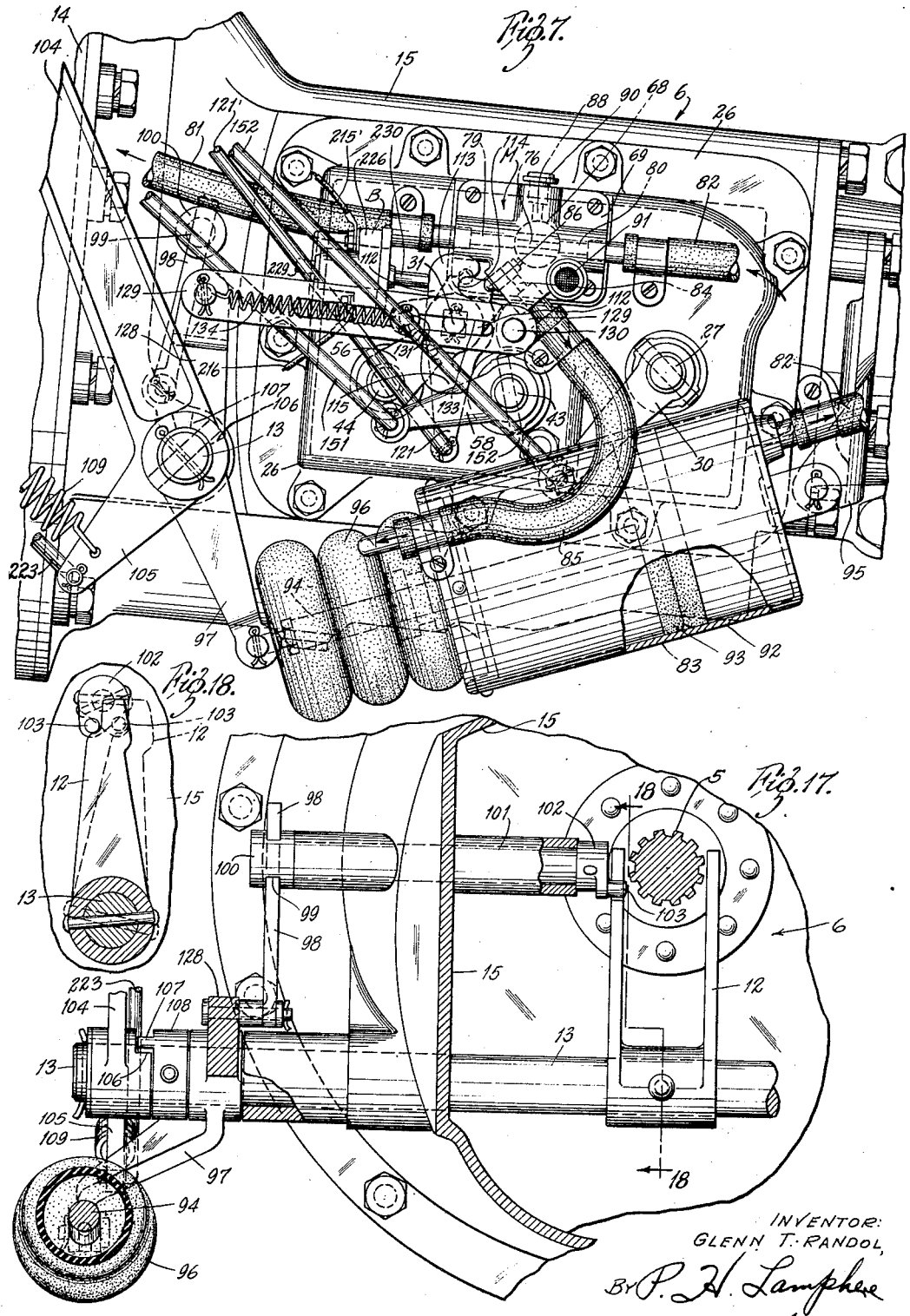

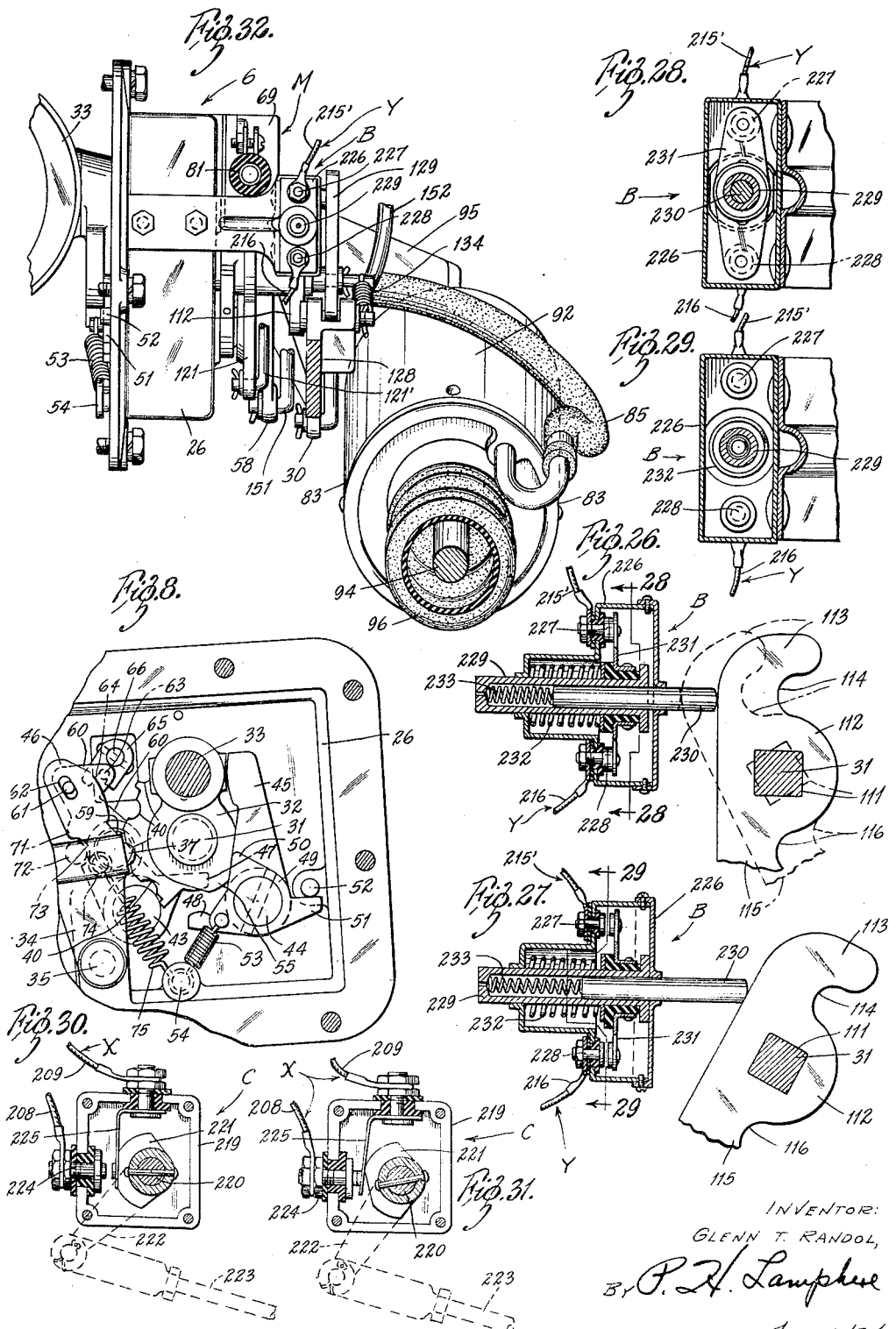

Jan. 20, 1948.  G. T. RANDOL  2,434,717
POWER DRIVE CONTROL SYSTEM
Filed Dec. 10, 1941   15 Sheets-Sheet 6

INVENTOR:
GLENN T. RANDOL,
BY P. H. Lamphere
ATTORNEY.

Jan. 20, 1948.　　　G. T. RANDOL　　　2,434,717
POWER DRIVE CONTROL SYSTEM
Filed Dec. 10, 1941　　　15 Sheets-Sheet 7

INVENTOR:
GLENN T. RANDOL,
BY P. H. Lamphere
ATTORNEY.

Jan. 20, 1948.  G. T. RANDOL  2,434,717
POWER DRIVE CONTROL SYSTEM
Filed Dec. 10, 1941   15 Sheets-Sheet 8

INVENTOR:
GLENN T. RANDOL,
BY P. H. Lamphere
ATTORNEY.

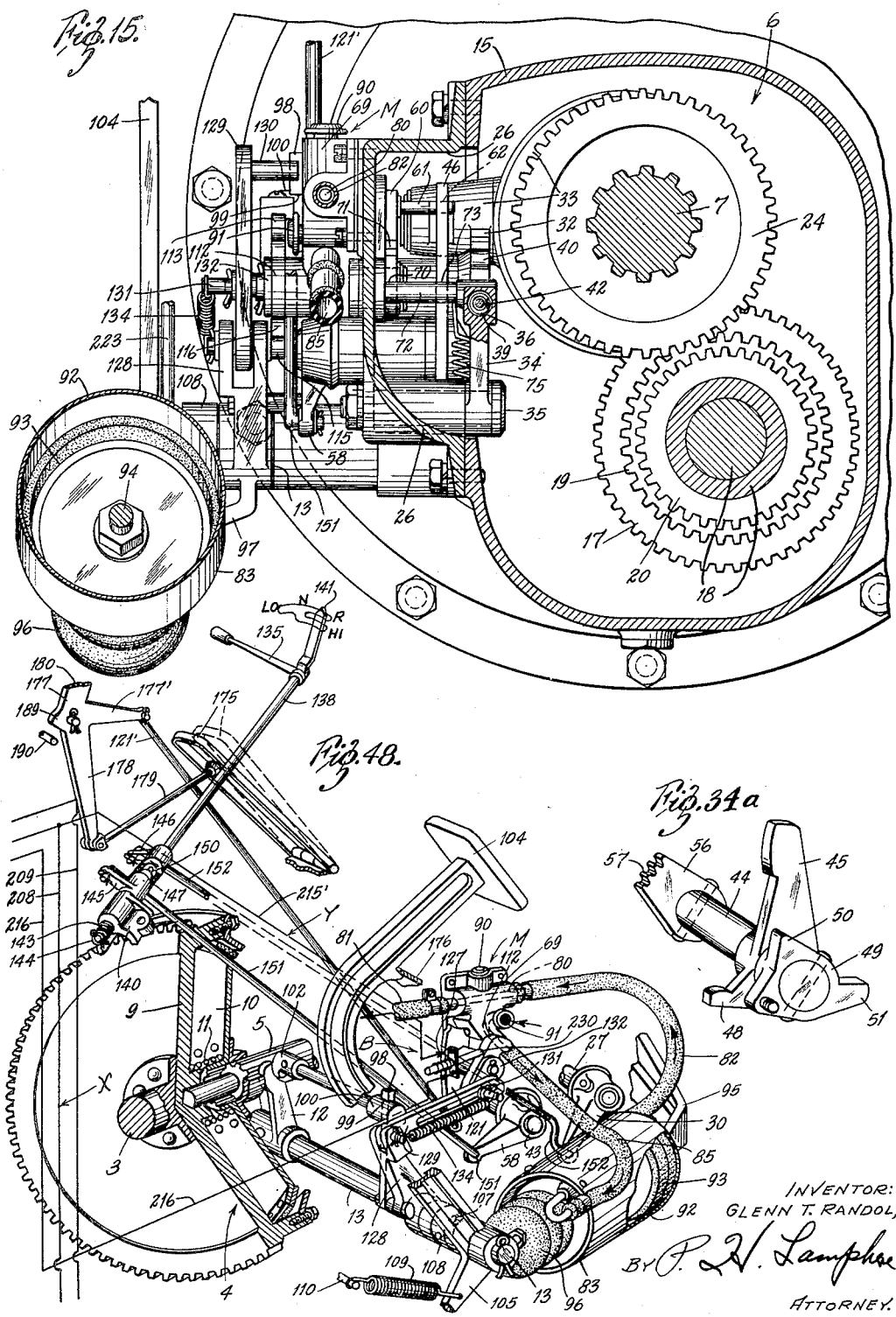

Jan. 20, 1948.    G. T. RANDOL    2,434,717
POWER DRIVE CONTROL SYSTEM
Filed Dec. 10, 1941    15 Sheets-Sheet 10
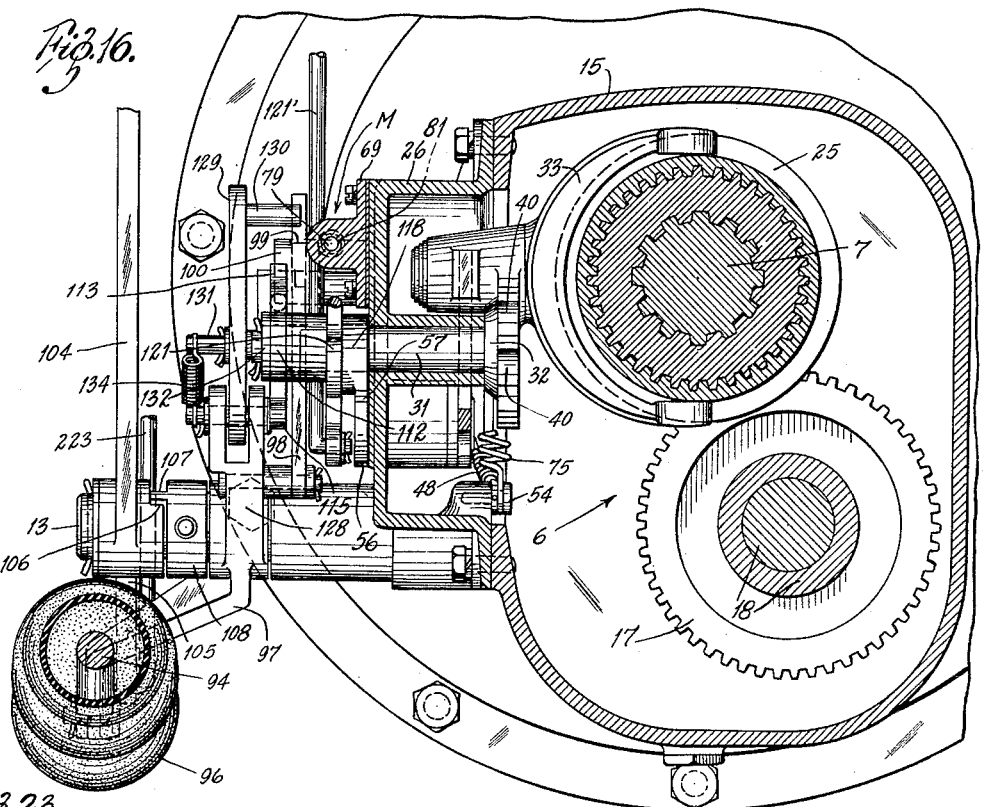
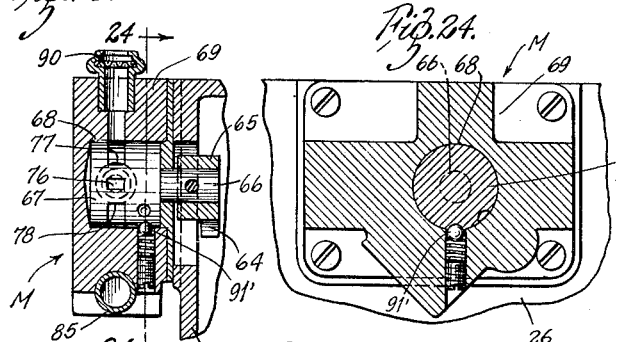
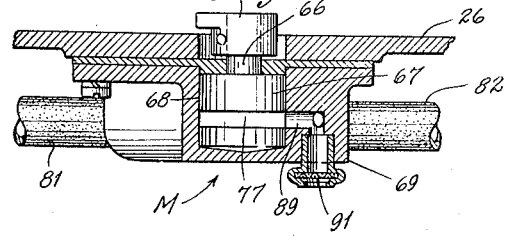
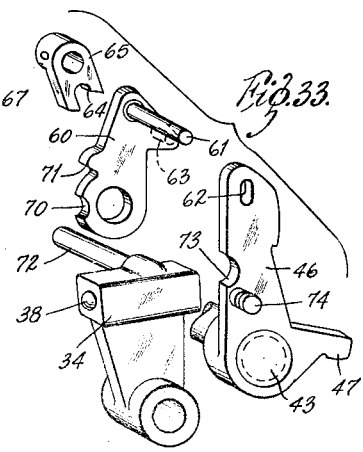
INVENTOR:
GLENN T. RANDOL,
BY P. H. Lamphere
ATTORNEY.

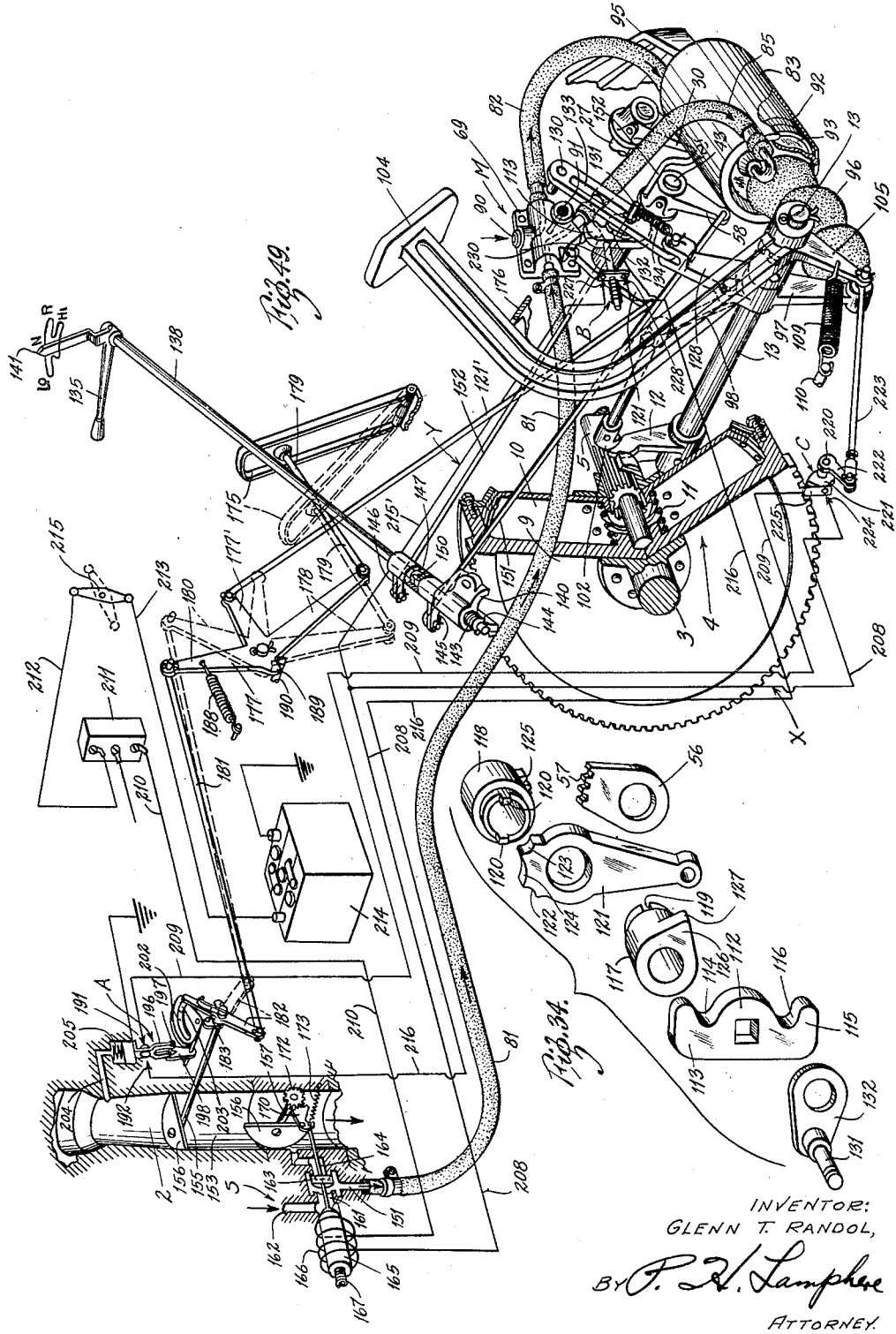

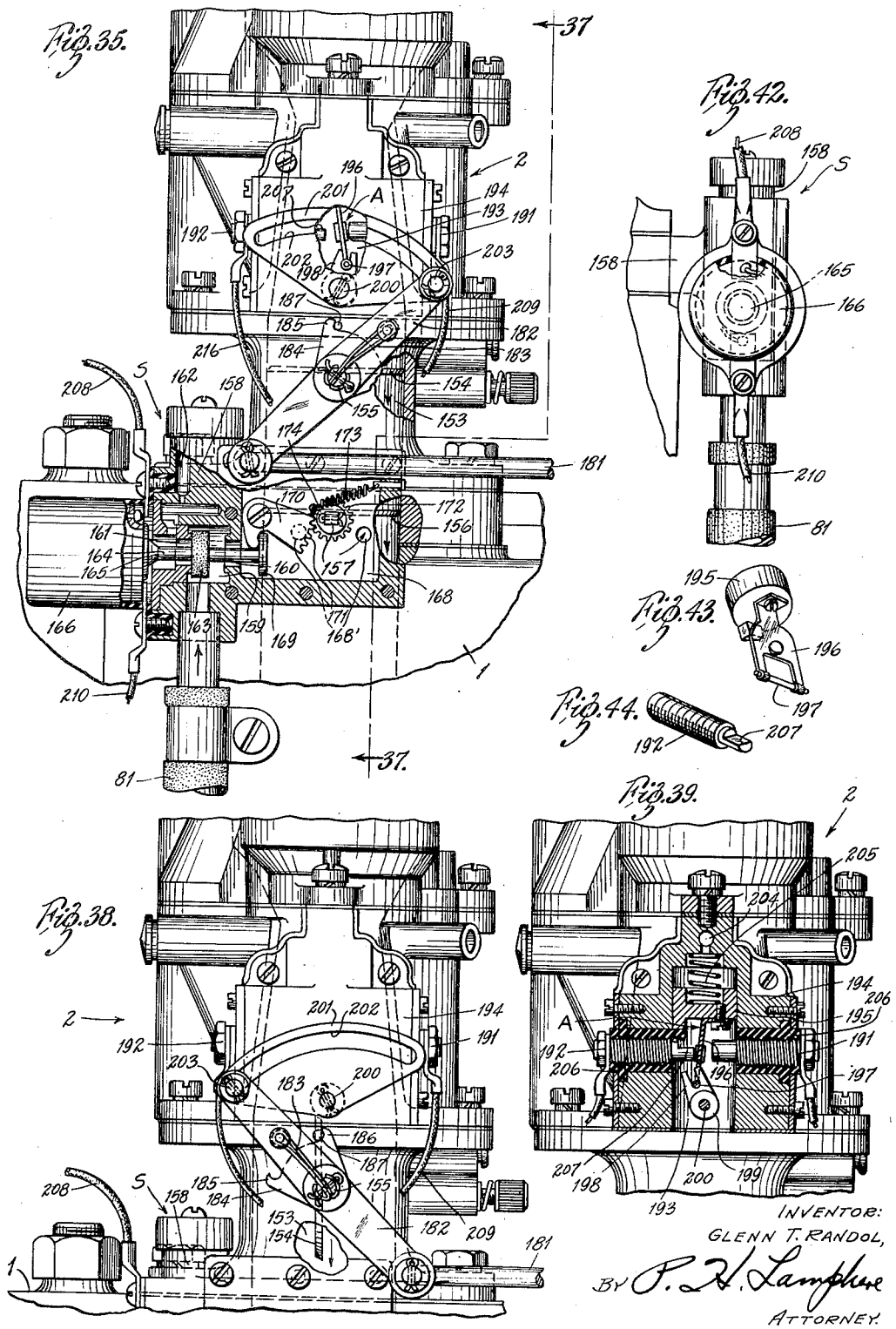

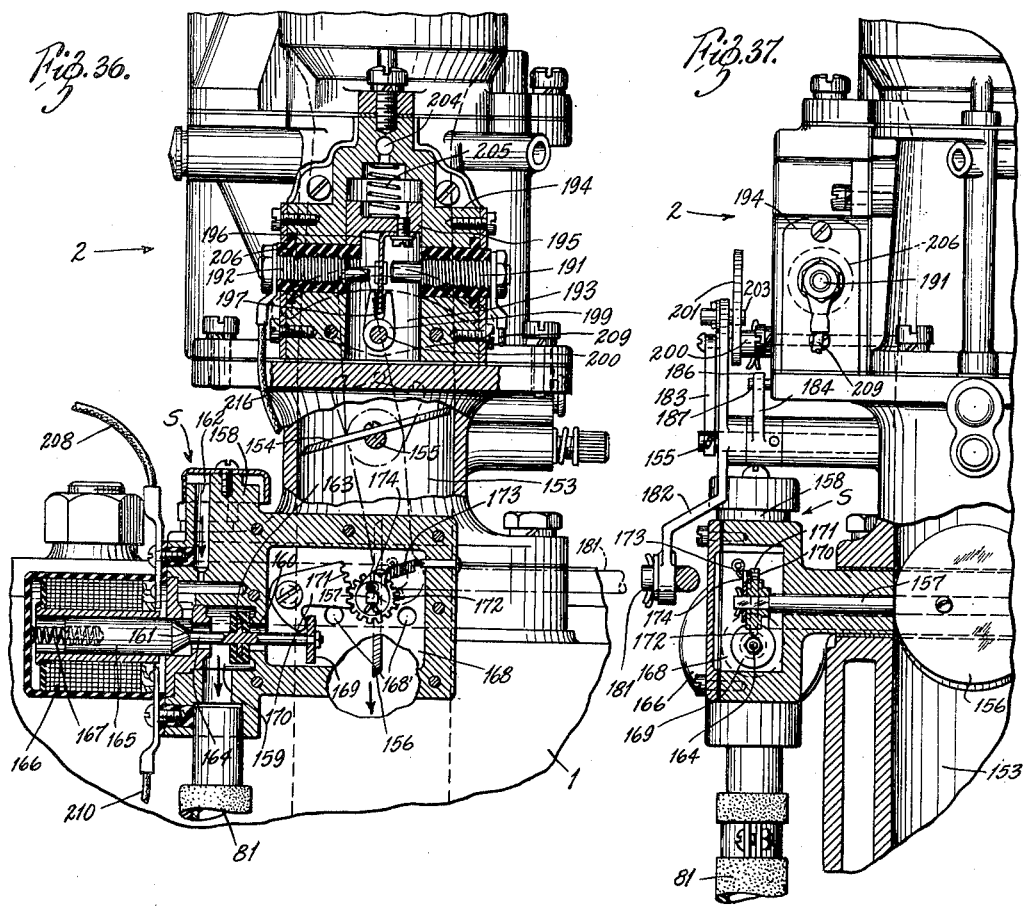

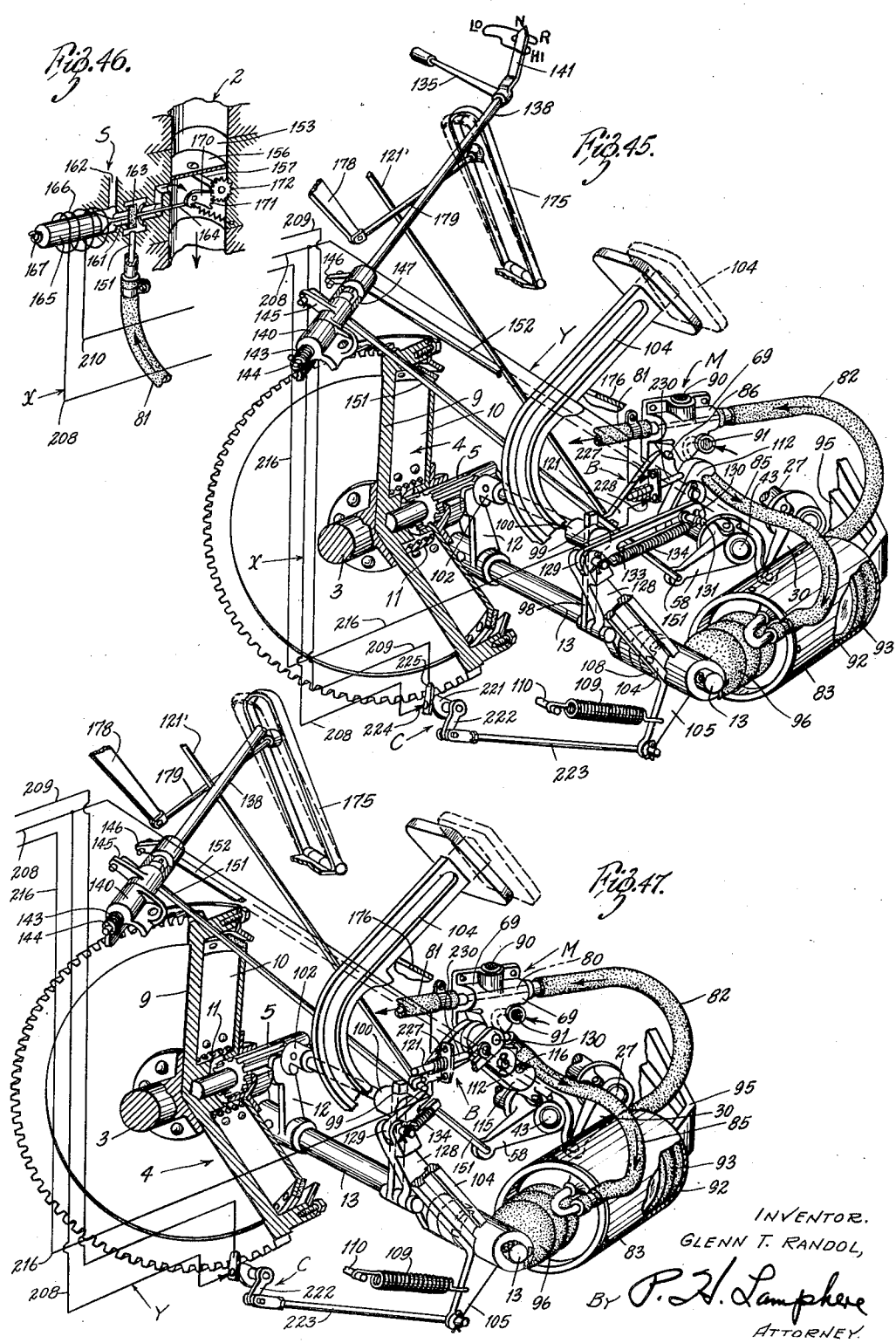

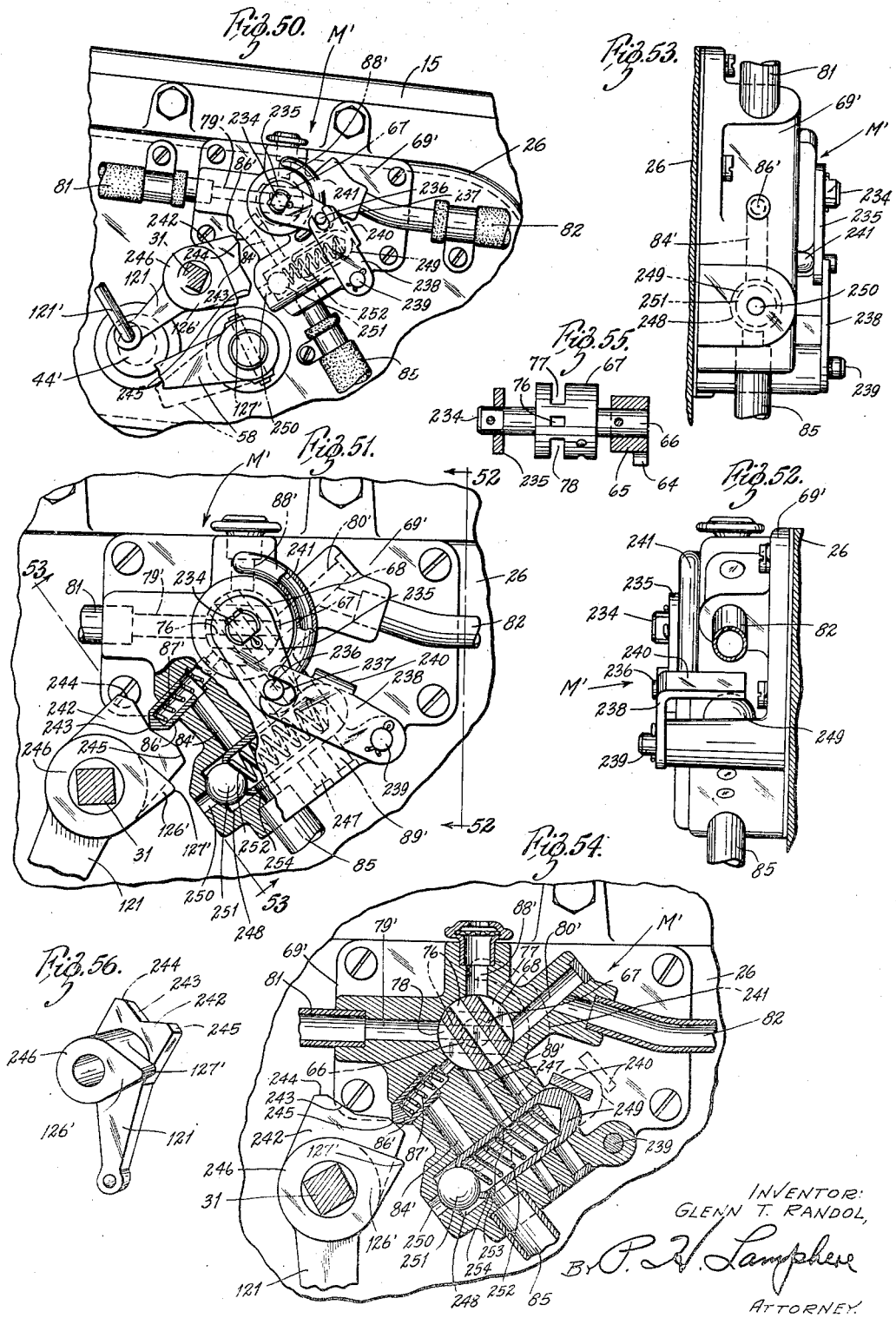

Patented Jan. 20, 1948

2,434,717

UNITED STATES PATENT OFFICE 2,434,717

POWER DRIVE CONTROL SYSTEM

Glenn T. Randol, Detroit, Mich.

Application December 10, 1941, Serial No. 422,332

76 Claims. (Cl. 192—.01)

This invention relates to power drive control systems and more particularly to means for controlling the transmission of power through the main clutch and change speed gearing of a motor vehicle in a simple, efficient and effortless manner.

One of the objects of my invention is to provide an improved control means for a change speed gearing in which the change between two speed ratios and the proper operation of the main clutch necessary during said change can all be accomplished by the employment of a single power-operated member such as, for example, a suction motor operated by the suction created in the intake manifold of the vehicle engine with which the gearing and clutch are associated.

Another object of my invention is to so associate and connect the suction motor with the main clutch and the change speed gearing that the movement of its movable element in one direction will cause the main clutch to be disengaged and then subsequently the shifting of the shiftable element of the gearing, and wherein the suction motor will be so controlled during the return movement of the movable member that the main clutch will be caused to smoothly engage.

Another object of my invention is to provide in a gear shifting mechanism, means which will be so controlled by the accelerator mechanism of the vehicle engine that the shifting mechanism cannot be operated to perform a shifting operation unless the accelerator mechanism is in a predetermined position.

Another object of my invention is to provide an improved control mechanism for a change speed transmission in which the shifting of two speed ratios can be accomplished by the employment of a single power-operated member and wherein the said two speed ratios are automatically alternately engaged and disengaged by the single power-operated member by means operative when the accelerator mechanism is respectively in a depressed position and in a released position, said positions being beyond the normal throttle range.

Another object of my invention is to provide control means for a change speed gearing and associated main clutch in which one of two speed ratios may be mechanically preselected when the accelerator mechanism is released and the other speed ratio preselected when the accelerator pedal is depressed beyond its operating range, and wherein the clutch will be allowed to automatically engage when the accelerator pedal is moved between said released and depressed positions.

Another object of my invention is to provide valve controlling means for the single power-operated member such that the movement of the hand lever adjacent the steering wheel from the neutral position to the automatic position will normally cause the single power-operated member to function upon either the releasing or the depressing of the accelerator pedal beyond normal throttle range and wherein, upon the resetting of the hand lever from the automatic position to neutral position, will operate said valve controlling means to cause the suction from the engine intake manifold to reverse the movement of the power-operated piston such that the active gear may be manually restored to its neutral position and thus definitely establish the neutral condition of the gearing in the transmission.

Another important object of my invention is to provide accelerator controlled clutch operating mechanism whereby slight depression of the accelerator pedal from its fully released position without accelerating the engine will cause the clutch to engage and thus permit the engine to be employed for braking purposes.

Another important object of my invention is to provide an accelerator pedal controlled main clutch and gear changing mechanism which will cause the clutch to be disengaged and the gear change accomplished in proper sequence by means operative when the accelerator pedal is moved to a position beyond the normal throttle range.

Another object of my invention is to provide an improved control mechanism for a change speed transmission in which certain predetermined positions of the accelerator mechanism can be employed to cause the control mechanism to be operative.

Another object of my invention is to provide a control mechanism for a change speed gearing wherein manually-controlled means may be employed to condition the shifting mechanism for obtaining certain speed ratios and these speed ratios alternately made operative by the releasing of the accelerator mechanism and the actuation of a control member such as, for example, the clutch pedal, thus eliminating the necessity for performing certain manual operations necessary in prior shifting mechanisms wherein all speed ratios must be obtained by a manual movement of a member such as a gear shift lever.

Another object of my invention is to provide control means for a change speed gearing and a main clutch which will cause the gearing, when in high speed condition, to be automatically shifted to second speed position by the simple operation of moving the accelerator pedal to a position beyond full throttle open position.

Another object of my invention is to provide improved carburetor control means whereby when the accelerator mechanism is operated to a position beyond full throttle open position during the shift from the high speed ratio to the second speed ratio, the engine will be caused to idle during the shifting operation.

Another object of my invention is to provide an improved control means for a vehicle transmission embodying a change speed gear and a main clutch wherein the low and reverse speed ratios may be obtained in a conventional manner by movement of a gear shift lever in coordination with the manual movement of the clutch pedal and wherein the second and high speed ratios may be obtained without the necessity of manually moving the gear shift lever other than to place it in a predetermined position for conditioning purposes.

Other objects of my invention will become apparent from the following description taken in connection with the accompanying drawings in which Figure 1 is a side view of a portion of a motor vehicle showing the engine, the change speed transmission and the main clutch operating pedal with which is combined certain structure to form a control mechanism embodying my invention, the parts being in their normally-inoperative positions wherein the main clutch is fully engaged and the change speed transmission is in neutral condition;

Figure 2 is a view taken as indicated by the line 2—2 of Figure 1;

Figure 3 is a view taken as indicated by the line 3—3 of Figure 1;

Figure 6 is a view similar to Figure 4 but with the clutch pedal manually moved to clutch-disengaged position and the transmission shifted so that low speed ratio is operative;

Figure 7 is another view similar to Figure 4 but with the parts in the positions assumed when the hand lever is set for automatic operation of the second and high speeds, the clutch pedal being in a disengaged position and the second gear ratio element about to be made operative by being shifted from its neutral position;

Figure 8 is a partial view of the parts on the inside of the closure plate showing their positions corresponding to the positions of the parts shown in Figure 7;

Figure 15 is a sectional view taken on the line 15—15 of Figure 4;

Figure 16 is a view taken on the line 16—16 of Figure 4;

Figure 17 is a sectional view taken on the line 17—17 of Figure 4;

Figure 18 is a sectional view taken on the line 18—18 of Figure 17;

Figure 19 is an enlarged partial sectional view of the main control conditioning valve and the restricting valve controlled by the accelerator mechanism, the parts having the positions assumed when the throttle is fully closed;

Figure 20 is a view similar to Figure 19 but showing the parts in the positions they assume when the accelerator pedal is fully depressed;

Figure 21 is a view similar to Figure 20 but showing the parts when the accelerator pedal is initially released from a fully depressed position;

Figure 22 is a view similar to Figure 21 but showing the parts when the accelerator pedal is partially depressed;

Figure 23 is a sectional view through the main control valve, said view being taken on the line 23—23 of Figure 20;

Figure 24 is a sectional view taken on the line 24—24 of Figure 23;

Figure 25 is a sectional view taken on the line 25—25 of Figure 4;

Figure 26 is a sectional view of the cut-out switch mounted on the transmission cover and showing the switch in closed position as assumed when the transmission is in either neutral or high gear ratio;

Figure 27 is a view similar to Figure 26 but showing the switch open, which condition exists when the gearing is in second speed ratio;

Figure 28 is a view taken on the line 28—28 of Figure 26;

Figure 29 is a sectional view taken on the line 29—29 of Figure 27;

Figure 30 is a view of the clutch pedal controlled switch showing it in open condition;

Figure 31 is a view of the clutch pedal controlled switch showing it in closed condition;

Figure 32 is a view taken on the line 32—32 of Figure 4;

Figure 33 is an exploded view of the interlocking arm and associated lever and arms mounted on the inside of the closure plate;

Figure 34 is an exploded view of certain parts mounted on the exterior portion of the shaft for controlling the second and high speed shifting fork and the rate of clutch engagement;

Figure 34A is a perspective view of other parts employed in neutralizing and controlling the alternate moving of the second and high speed shifting fork.

Figure 35 is a view of the carburetor and associated parts including the solenoid-controlled valve for connecting the power cylinder with the inlet passage of the carburetor, the accelerator pedal controlled butterfly valve being in closed position;

Figure 36 is a view similar to Figure 35 but showing the parts in the positions assumed when the accelerator pedal is depressed;

Figure 37 is a view taken on the line 37—37 of Figure 35;

Figure 38 is a view similar to Figure 35 but showing the carburetor butterfly valve in fully open position corresponding to the depression of the accelerator pedal beyond its engine controlling range;

Figure 39 is a view, partly in section, showing the position of the accelerator pedal selector switch when the accelerator is fully depressed;

Figure 40 is a view similar to Figure 39 but showing the movable element of the switch moved upwardly, the position assumed when the engine operates at a predetermined speed;

Figure 41 is a sectional view taken on the line 41—41 of Figure 40;

Figure 42 is an end view of the solenoid-controlled valve;

Figure 43 is a perspective view of the piston and the switch element carried thereby which forms a part of the accelerator pedal selector switch;

Figure 44 is a perspective view of one of the stationary contacts of the accelerator pedal selector switch;

Figure 45 is a diagrammatic view, parts being shown in section, showing the various parts of the transmission control mechanism in their positions assumed when the transmission is in second speed ratio and the main clutch is disengaged;

Figure 46 is a diagrammatic view of certain parts associated with the carburetor, particularly the solenoid-controlled valve and the secondary butterfly valve;

Figure 47 is a diagrammatic view similar to Figure 45 but showing the parts in the positions they assume when high speed ratio is operative and the main clutch is disengaged;

Figure 48 is a diagrammatic view also similar to Figure 45 but showing the parts in the positions they assume when the second speed ratio is caused to be operative as a result of the depressing of the accelerator pedal to the floorboard, said main clutch being in disengaged position;

Figure 49 is a diagrammatic view showing the parts in their positions when the transmission is in neutral position with the main clutch engaged and the accelerator fully released;

Figure 50 is a side view of a portion of the transmission showing a modified construction wherein the selection of the speed ratio is accomplished by the accelerator mechanism, the positions of the parts corresponding to a released condition of the accelerator mechanism with the hand lever set in "Hi" position;

Figure 51 is an enlarged view of some of the structure shown in Figure 50, the parts being shown in section and their positions corresponding to neutral condition of the gearing;

Figure 52 is a sectional view taken on the line 52—52 of Figure 51;

Figure 53 is a sectional view taken on the line 53—53 of Figure 51;

Figure 54 is a view similar to Figure 51 but showing a complete section, the positions of the parts corresponding to a fully depressed condition of the accelerator mechanism;

Figure 55 is a view of the rotatable element of the main control conditioning valve; and Figure 56 is a perspective view of the selector member which is operated directly by the accelerator mechanism.

Figure 4:
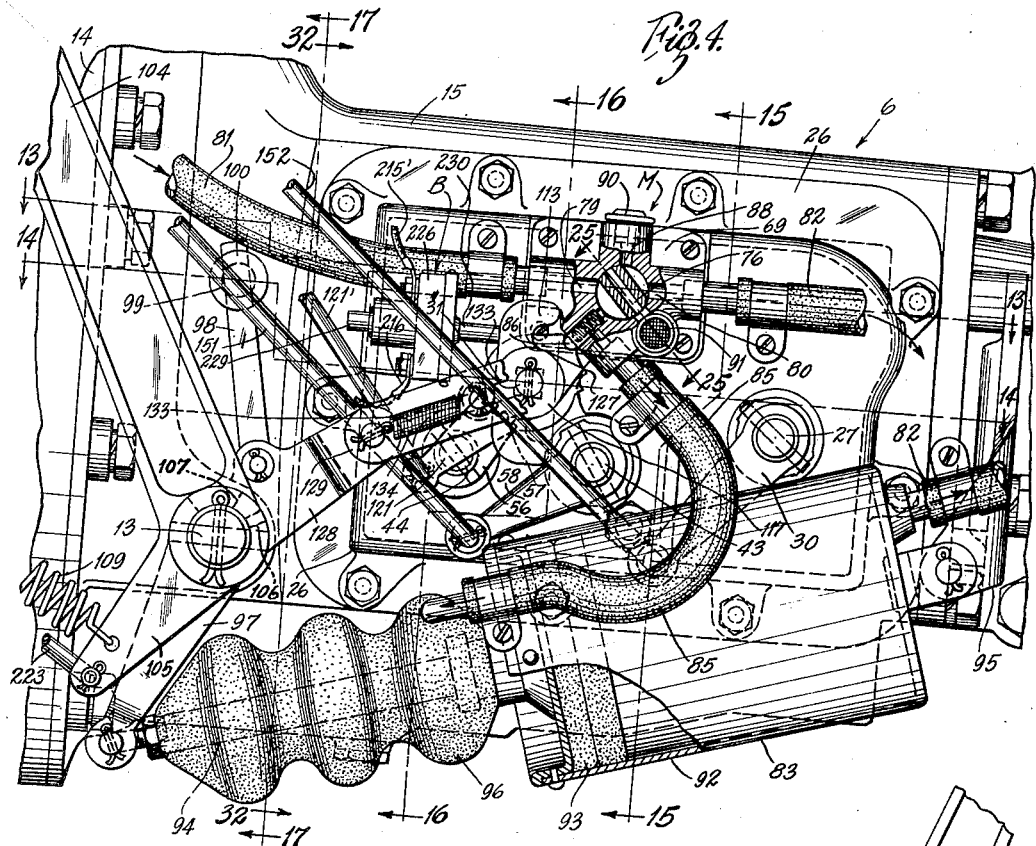
Figure 4 is an enlarged view of the parts associated with the main clutch pedal and mounted on the exterior of the transmission closure plate, said parts being shown in the neutral position with the clutch in engaged condition.

Referring first to Figure 1, numeral 1 indicates an internal combustion engine for a motor vehicle which is provided with the usual carburetor 2. The crankshaft 3 of the engine (see Figures 45, 47, 48 and 49) is connected through a main friction clutch 4 to the driving shaft 5 of the change speed gearing 6. The driven shaft 7 of this gearing is in turn connected to a propeller shaft 8 for driving the wheels of the vehicle in a well-known manner. The main friction clutch 4 comprises an element 9 fixed to the end of the crankshaft and a cooperative element 10 slidably mounted on the driving shaft 5 of the gearing. The slidable element 10 is normally held in engagement with element 9 by a spring 11 and is adapted to be disengaged by a fork 12 secured to the inner end of a clutch shaft 13. The main friction clutch is enclosed in the housing 14 which is interposed between the engine 1 and the gearing housing 15 (see Figure 1).

Figure 13:
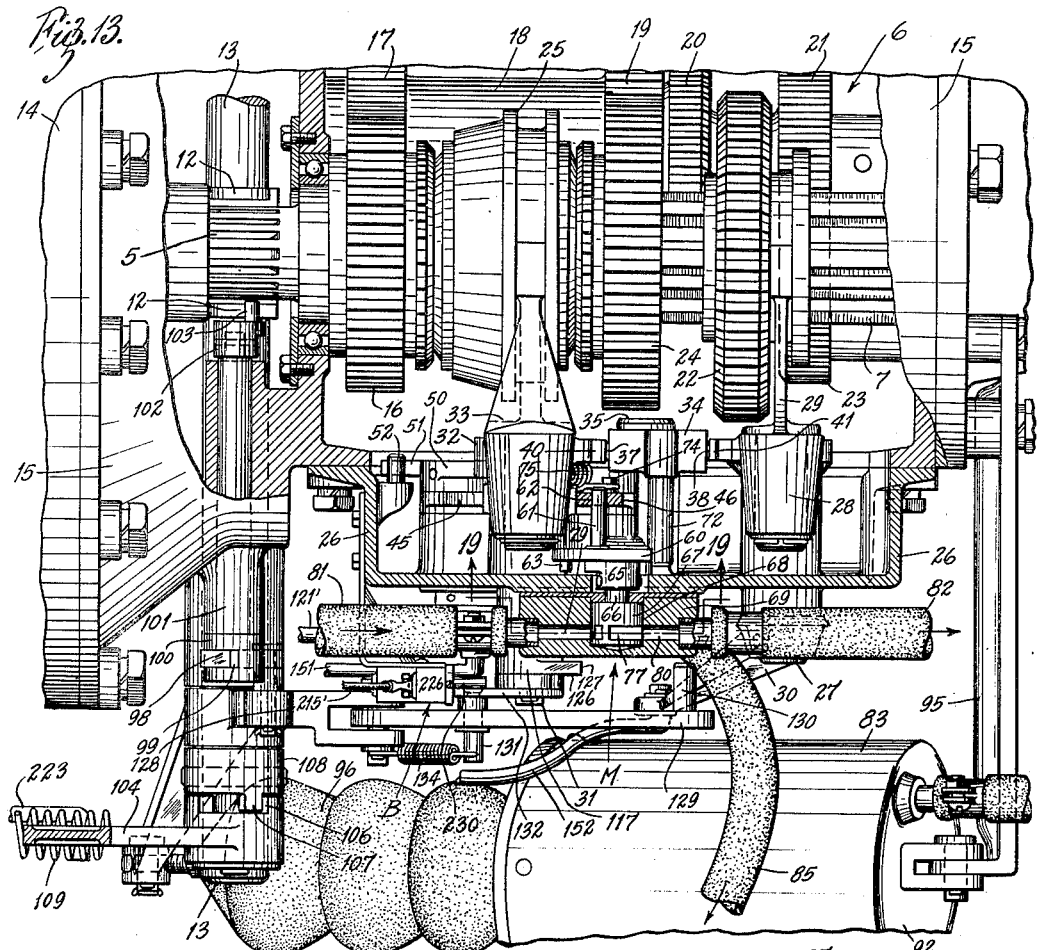
Figure 13 is a sectional view taken on the line 13—13 of Figure 4.

As best shown in Figure 13, the change speed gearing within the housing 15 is of conventional construction and comprises a driving gear 16 secured to the end of the driving shaft 5 projecting into the housing. This gear 16 is in constant mesh with the gear 17 on the countershaft 18 which also has integral therewith a second speed gear 19, a low speed gear 20, and a reverse gear 21. The driven shaft 7 of the gearing is axially aligned with the driving shaft and has its forward end journaled therein. The rear portion of the driven shaft has splined thereon a slidable gear 22 which is adapted to mesh with gear 20 to provide low speed ratio and also with the idler gear 23 (constantly in mesh with gear 21) to provide reverse speed ratio.

The central portion of the driven shaft 7 has rotatably mounted thereon a second speed gear 24 which is constantly in mesh with the second speed gear 19 on the countershaft. Positioned on the driven shaft between the gears 16 and 24 and rotatable therewith is a slidable double clutch element 25 which, when slid rearwardly, will clutch the second speed gear 24 to the driven shaft and when slid forwardly will clutch the driving shaft 5 directly to the driven shaft to thus obtain second speed ratio and high speed ratio, respectively. The clutch element 25 and the manner in which it is capable of performing its function is well known in the art and need not be specifically described. It might be mentioned, however, that the cooperating clutch teeth on said element and the gears have associated therewith synchronizing means for enabling the clutch teeth to be smoothly engaged.

The change speed gearing housing 15 has an opening on one side which is closed by a closure plate 26. On the rear end of this plate there is journaled a shaft 27 (Figure 14) which has secured to its inner end an upstanding arm 28 and journaled in the upper end of this arm is a shifting fork 29 for cooperation with the gear 22 whereby this gear may be shifted forwardly and rearwardly from its neutral position, shown in Figure 13, in order to obtain low and reverse gear ratios. The outer end of the shaft 27 has secured thereto an arm 30 whereby the shaft may be rotated from the exterior of the closure plate in a manner to be later described.

Also journaled in the closure plate at a point forwardly of shaft 27 is a second shaft 31 which has secured on its inner end an upstanding arm 32, the upper end of which has pivotally mounted therein a shifting fork 33 for cooperation with the double clutch element 25 to thus shift said clutch rearwardly and forwardly from its central neutral position, as shown in Figure 13, and thus obtain second speed and high speed ratios, respectively.

Figure 14:
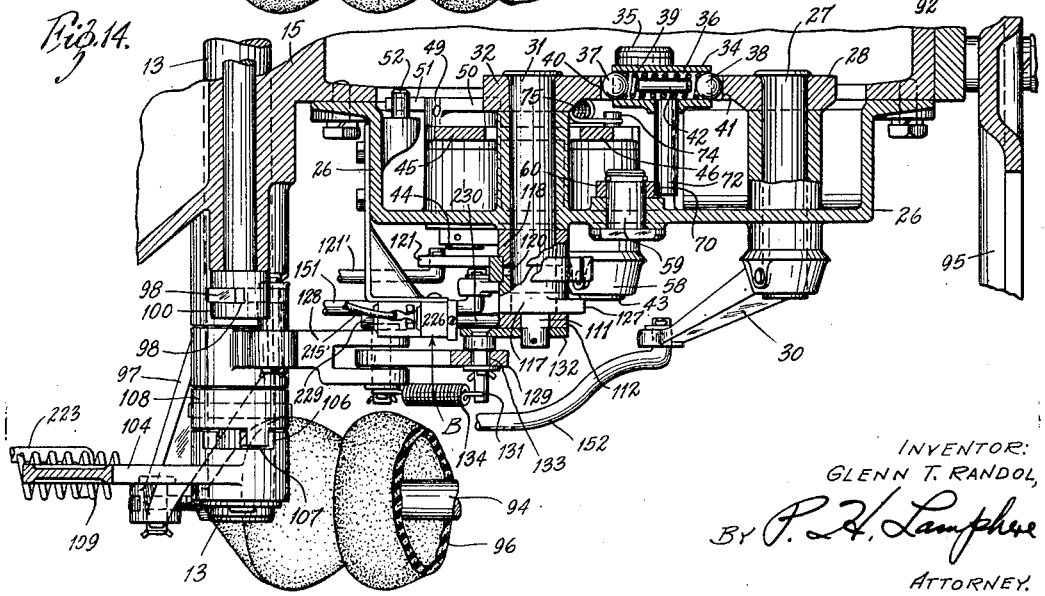
Figure 14 is a sectional view taken on the line 14—14 of Figure 4.

In order to provide an interlocking means for the shifting forks and thus prevent either of them from being moved from a neutral position to an operative position when the other is in an operative position, there is mounted on the lower side of the closure plate, an arm 34 pivoted on a shaft 35 and extending upwardly between the arms 28 and 32 (see Figures 13, 14, and 15). This arm 34 is provided with a bore 36 carrying in its ends balls 37 and 38 pressed outwardly by an interposed spring 39. Ball 37 is adapted to cooperate with recesses 40 in the hub of arm 32 to yieldably hold shifter fork 33 in its various positions and the ball 38 is adapted to cooperate with recesses 41 in the hub of arm 28 to yieldably hold shifter fork 29 in its various positions. The balls also have interposed between them a pin 42 which limits their movement toward each other. With this interlocking structure, which is of known construction, when the shifting fork 29 is moved to cause gear 24 to mesh with either of the gears 20 or 23, arm 32 will be prevented from being rotated to move shifting fork 33 from its central position due to the contoured edge of the hub of arm 28 holding the end of the wall of bore 36 seated against two flat surfaces adjacent the central (neutral) recess 40. When the shifting fork 33 is moved in either direction to cause the double clutch element 25 to be in an operative position, the shifting fork 29 will be prevented from moving by the contoured edge of the hub of arm 32 acting on arm 34 to cause the end of the wall of bore 36 to firmly seat against the two flat surfaces adjacent the central (neutral) recess 41.

In addition to the shafts 27 and 31 carried by the closure plate, there are two other shafts 43 and 44 positioned below the shaft 31 and on opposite sides thereof. On the inner end of shaft 44 (see Figures 5, 10 and 12) there is freely mounted a neutralizing lever 45 which extends upwardly to one side of arm 32 on shaft 31. The inner end of shaft 43 has secured thereto a companion neutralizing lever 46 which extends upwardly on the opposite side of arm 32. Lever 46 is shown in perspective in Figure 33. The lever 46 carries an extension 47 which overlies a similar extension 48 on lever 45. Thus, if lever 46 should be moved inwardly from its extreme outer position, lever 45 will also be moved simultaneously inwardly after a predetermined movement of the lever 46 (see Figure 12). However, if lever 46 is moved outwardly from its extreme inner position, lever 45 will not be moved simultaneously therewith.

Figure 10:
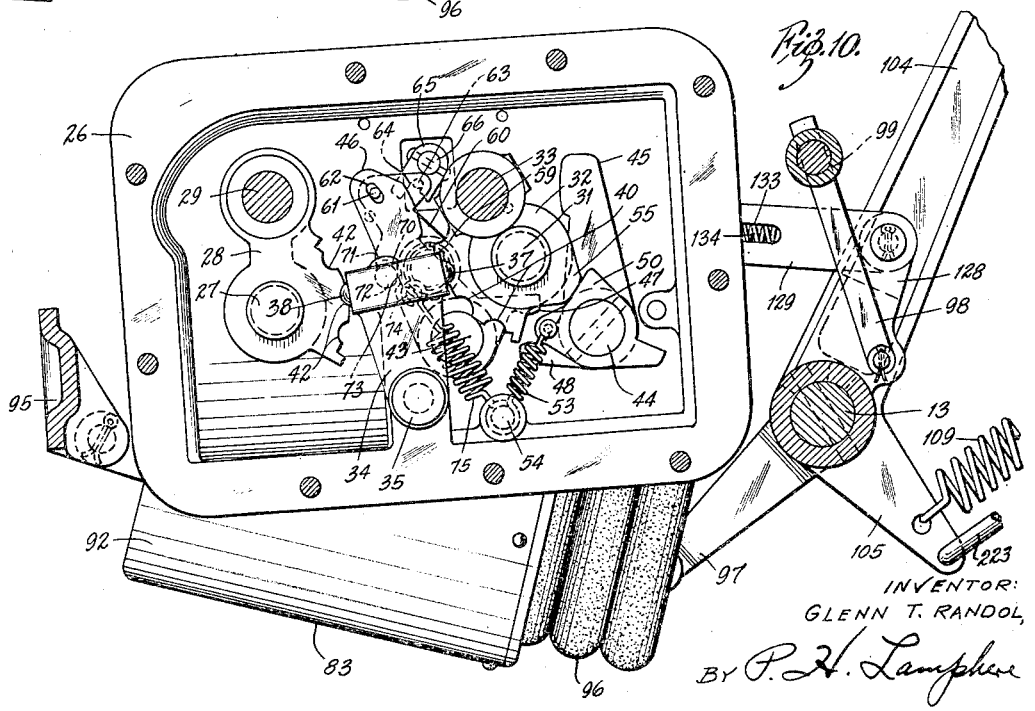
Figure 10 is a view of the parts on the inside of the closure plate showing their positions corresponding to the positions of the parts shown in Figure 9.

On the inner end of shaft 44 beyond lever 45 there is pinned thereto a member 49 having a projecting cam portion 50 (see Figure 34A). This member is also provided with an extension 51 for cooperation with a stop 52 on the cover plate where it is normally biased by a spring 53 having one end connected to the member and the other to a pin 54 carried by the backing plate. The cam portion 50 in its normal position is adapted to lie in the path of a cooperating cam portion 55 on the lower side of the hub of arm 32 when said arm is moved to cause the second speed ratio to be operated. Figure 10 shows the cam portion 55 in engagement with the cam portion 50. Under these conditions it is seen that the member 49 is rotated against the bias of spring 53, thus rotating shaft 44. Shaft 44 on its end exterior of the cover plate has secured thereto an arm 56 provided with teeth 57, the purpose of which will become apparent.

Figure 12:
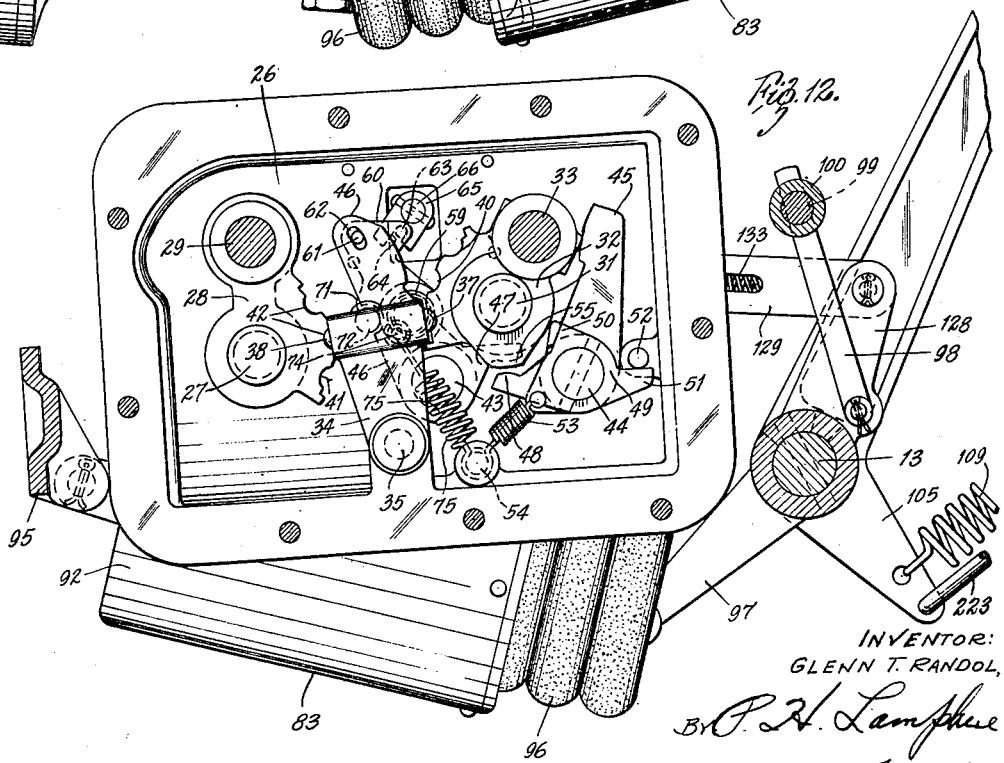
Figure 12 is a view of the parts on the inside of the closure plate showing said parts in their positions corresponding to the positions of the parts shown in Figure 11.

The outer end of shaft 43 to which lever 46 is secured has pinned thereto an arm 58 in order that this shaft may be manually operated in a manner to be described to thus cause the lever 46 to be moved away from the shifting fork arm 32 or toward said arm. When lever 46 is moved away from the shifting fork arm, as shown in Figures 10 and 12, lever 45 will not be moved. However, as previously mentioned, if lever 46 is moved toward the shifting fork arm to a position engaging it, then lever 45 will also be moved simultaneously toward the shifting fork arm. If the shifting fork arm should be in an operative position, that is, either second or high speed operative position, then it will be moved inwardly by one of these arms to its neutral position, as shown in Figure 13. Thus there is provided means for neutralizing the gearing if the gearing is in second or high speed since, as will be described later, shaft 43 is manually operated.

Above shaft 43 there is journaled in the cover plate still another shaft 59 which projects only into the interior of the gearing housing. This shaft has freely journaled thereon an arm 60 which extends upwardly along side lever 46 and carries a pin 61 which projects through a slot 62 in said lever 46. Thus it is seen that lever 46 and arm 60 have their free ends movable in unison but said elements rotate about different axes. The arm 60 also carries a second pin 63 (see Figure 33) which projects into an open ended slot 64 in the end of a short arm 65 secured to a pin 66, said pin being carried by a rotatable valve element 67 (see Figures 23 and 25) mounted in a bore 68 of a valve casing 69 secured to the exterior of the closure plate adjacent the top side. The valve comprising the valve element 67 and the casing 69 constitute parts of the main control conditioning valve for the power-operated shifting means to be described later, this main control conditioning valve being generally designated by the letter "M".

Referring again to Figure 33, the previously mentioned arm 60 has its hub portion provided with a recess 70 and on the body of the arm above this recess is a shoulder 71. The recess 70 is adapted to receive a pin 72 carried by arm 34 of the described interlocking structure. Thus, if the interlock member 34 should be moved forwardly, as viewed from the inside of the closure plate (Figures 10 and 12), pin 72 can engage in the recess and prevent arm 60 from being moved. This forms a lock for the valve element 67. When pin 72 is out of recess 70 so as to permit arm 60 to be moved, shoulder 71 will engage the pin and limit the movement of said arm. The lever 46 is also provided with a recess 73 for receiving pin 72 so that said lever can have sufficient movement to move arm 60. A pin 74 is carried by lever 46 to which an over-center spring 75 is connected, said over-center spring assisting to hold lever 46 in its outward position when once placed in said position and assisting in moving the lever inwardly once the lever has been initially moved.

The main control conditioning valve M, previously referred to, is shown in detail in Figures 19 to 25. The cylindrical valve element 67 is provided with a cross-passage 76 and parallel surface slots 77 and 78 on opposite sides thereof. The casing 69 is formed with aligned passages 79 and 80 of which the cross-passage 76 of the valve element can align to place these passages in communication with each other. Passage 79 is connected by a flexible conduit 81 to the source of suction which in this instance will be the intake of the engine. The other passage 80 is connected to a flexible conduit 82 which communicates with the rear end of the suction motor 83 which is the power means shown, by way of example, for performing speed ratio changing. The valve casing is also provided with a third passage 84 which enters the bore in the valve casing at an angle to passage 79. This passage 84 is connected by a conduit 85 to the forward end of the suction motor 83. The passage 84 is adapted to be controlled by a small restricting valve element 86 which is normally biased by a spring 87 to such a position that passage 84 will be fully open. If this restricting valve element 86 is moved inwardly, passage 84 will be restricted. The means for controlling the restricting valve element will be described later. The valve casing also has two atmospheric passages 88 and 89, one leading from the top of the bore and the other leading from the lower side of the bore. These passages have associated therewith air filters 90 and 91. A detent 91' cooperates with the recesses in the valve element 67 to hold it in its two positions.

In the valve structure described it is seen that when the valve element 67 is in a position to connect passages 79 and 80, the rear end of the suction motor 83 will be placed in communication with the source of suction. The forward end of the suction motor will be in communication with the atmosphere by way of conduit 85, passage 84, valve element slot 78 and atmospheric passage 89. This position of the valve is shown in Figure 20. If the valve element 67 should be turned to the position shown in Figure 19, then it is seen that the forward end of the suction motor will be connected to the conduit leading to the source of suction and the rear end of the motor connected to atmosphere through passage 88. Suction, however, is not available at the forward end of the motor for reasons which will become apparent.

The power means shown as a suction motor comprises a cylinder 92 in which is reciprocable a member in the form of a piston 93 having a piston rod 94 extending from the forward closed end of the cylinder. The rear end of the cylinder is pivotally mounted on a bracket 95 secured to the end of the gearing housing. The piston rod 94 is enclosed by a dust excluding boot 96 and has its outer end pivotally connected to an arm 97 which is rotatably mounted on the outer end of the clutch shaft 13 extending out of the clutch housing 14. Adjacent the hub of arm 97 is pivotally connected a link 98 which extends upwardly and is slidably received in a slot 99 of a shaft 100 positioned parallel to the clutch shaft 13 and carried by a sleeve 101 secured to the clutch housing (see Figure 17). The inner end of shaft 100 has pinned thereon a collar 102 from which projects a pin 103 positioned off center with respect to the axis of shaft 100. This pin, as shown in Figures 17 and 18, is adapted to engage with the rear side of the upper end of one of the arms of shifting fork 12. Thus it is seen from this structure that if the piston in the power cylinder is moved rearwardly from the forward end, arm 97 will be rotated in a counter-clockwise direction as viewed from the left side of the vehicle, thereby rotating shaft 100 in a clockwise direction and moving link 98 from the position shown in Figure 6 to the position shown in Figure 7. The rotation of shaft 100, although being through only a small angle, will result in pin 103 moving shifting fork 12 to thereby disengage the main clutch by moving the slidable element 10 thereof relatively to element 9.

On the outer end of the clutch shaft 13 is loosely mounted the manually-operated clutch pedal 104 which has a downwardly extending arm 105. The hub of this clutch pedal is provided with a shoulder 106 (see Figure 17) which is adapted to cooperate with a lug 107 carried by a collar 108 pinned to the clutch shaft 13 and interposed between the clutch pedal and the hub of arm 97. When the clutch is engaged and the clutch pedal is in its fully released position, shoulder 106 of the clutch pedal is spaced a slight distance from lug 107 on the collar as shown by dotted lines in Figure 4. This permits the clutch pedal to have a slight free forward movement before shoulder 106 and lug 107 engage to cause rotation of the clutch shaft. Whenever it is desired to manually disengage the clutch, it can be done by merely depressing the clutch pedal and when shoulder 106 engages lug 107, the clutch shaft 13 will be rotated to move the fork 12 so that the clutch will be disengaged. The clutch pedal is held in its released condition by a spring 109 connected between the downwardly extending arm 105 and a pin 110 on the exterior of the clutch housing.

The outer end of shaft 31, which is employed to move the shifting fork 33, is provided with a squared portion 111 whereby the double arm lever 112 (shown in perspective in Figure 34 together with other related elements) is secured thereto. The upper arm 113 of this lever is provided with a recess 114 and the lower arm 115 is provided with a recess 116. Positioned on the shaft between the double arm lever 112 and the closure plate are two collars 117 and 118, collar 117 being provided with slots 119 for receiving lugs 120 carried by collar 118, thus causing said collars to be connected together for simultaneous rotation on shaft 31. Surrounding these collars at their point of juncture and freely rotatable thereon is an arm 121 provided on its hub with spaced recesses 122 and 123 between which is a curved surface 124. The recesses and the surface are adapted to cooperate with the restricting valve 86 previously referred to which controls the passage 84 leading to the forward end of the suction motor. When the restricting valve is in either recess 122 or 123, the valve will be fully opened. When it is on the ends of the surface 124, the valve element will be closed by seating against a fiber seat. When the arm is moved so that the valve element moves from the recess 123 to recess 122, the valve will be permitted to be gradually opened.

The collar 118 lies just above the arm 56 which, as previously mentioned, is pinned to shaft 44. A portion of this collar is formed with teeth 125 which mesh with the teeth 57 on arm 56. Thus whenever the shaft 44 is rotated collars 118 and 117 will also be rotated thereby. The end of collar 117 which lies adjacent the double arm 112 is formed with a V-shaped cam surface 126 having an apex 127. This V-shaped cam points toward the rear and the apex lies between recesses 114 and 116 on the double arm.

The double arm lever 112 is actuated by the suction motor through arm 97 carried on the clutch shaft. The hub of arm 97 is provided with an upwardly extending arm 128 and pivotally connected to its upper end is a link 129. This link has on its free end a pin 130 for engaging in either recess 114 or 116 of the double arm lever thus causing rotation in opposite directions of the double arm lever and the shaft upon which it is mounted. The pin 130 is of such length as to cooperate with the V-shaped cam 126 which will control the guiding of the pin into the recesses. The link 129 is held in the desired position by means of a pin 131 carried by arm 132 freely mounted on the extreme outer end of shaft 31, said pin extending into a slot 133 running longitudinally of link 129. Between pin 131 and the upper end of arm 128 there is interposed a spring 134 which holds arm 132 in alignment with the line of pull of the spring.

Figure 9:
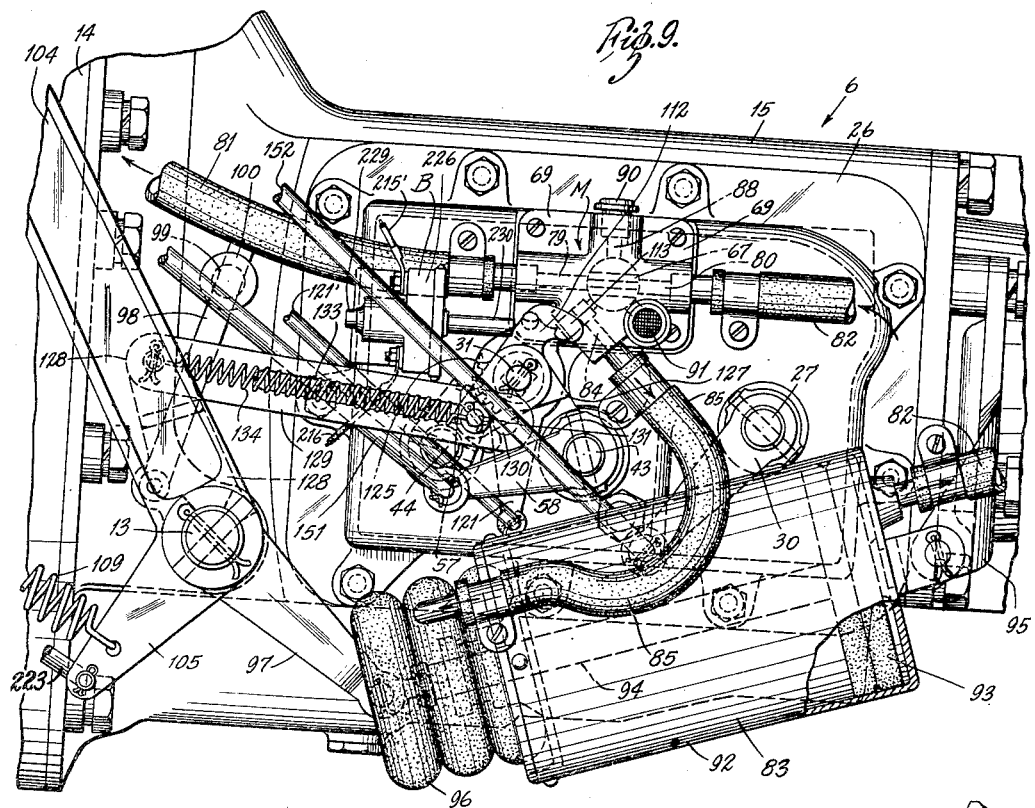
Figure 9 is a view similar to Figure 7 but showing the parts in the positions assumed when the second gear ratio has been made operative but prior to re-engagement of the main clutch.
Figure 11:
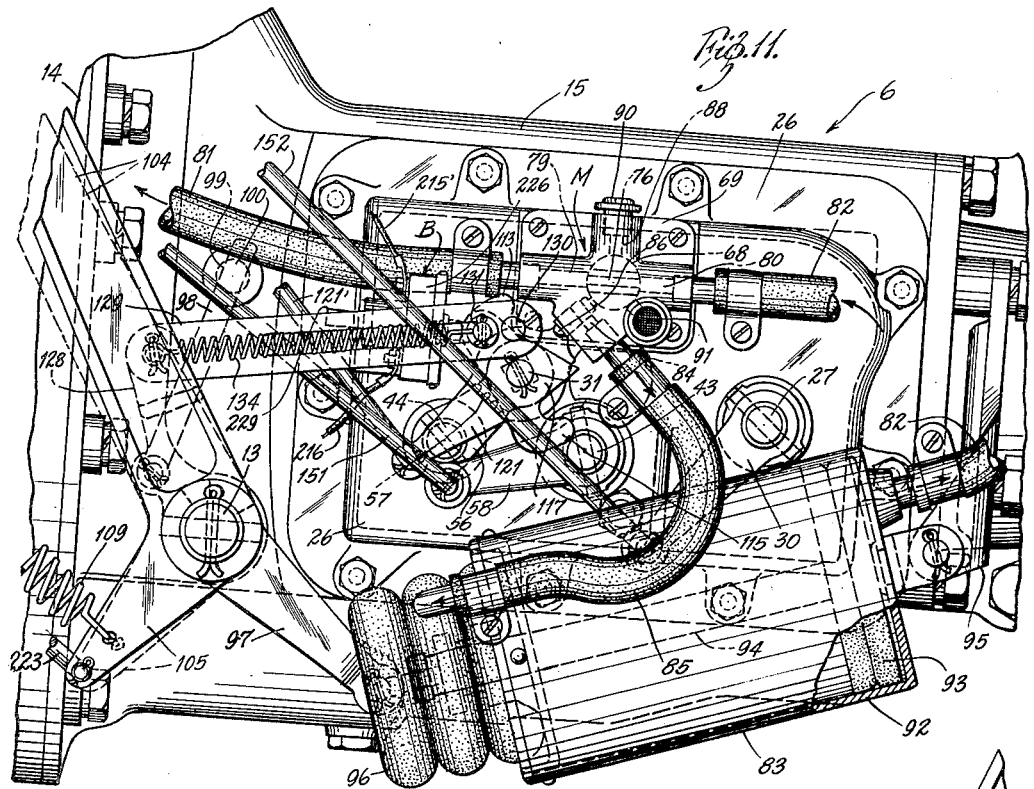
Figure 11 is another view of the parts on the exterior of the transmission showing the positions assumed when high speed ratio (direct drive) is made operative but prior to the re-engagement of the main clutch.

It is apparent from the structure just described that if arm 97 should be rotated in a counter-clockwise direction from its inoperative position, as shown in Figure 6, spring 134 will be elongated and link 129 slid forwardly on pin 131. After a predetermined amount of travel of link 129, pin 130 on the extreme end thereof will engage cam 126. If the apex 127 of this cam is above the line of movement of the link, pin 130 will be guided into recess 116 and thus cause rotation of the double arm lever in a clockwise direction to thereby rotate shaft 31 and cause the shifting fork 33 to move clutch element 25 so that the second speed ratio is operative. The position of the parts when the second speed ratio is operative is shown in Figure 9. If the apex 127 of the cam 126 is below the line of movement of the link, then pin 130 will be guided into the recess 114 and thus cause the link to rotate the double arm lever in a counter-clockwise direction so as to shift the shifting fork and the clutch associated therewith forwardly so as to cause high speed ratio to be operative. The positions of the parts when high speed ratio is operative are shown in Figure 11. The engagement of pin 130 with either of the recesses 114 or 116 of the double arm lever will not take place until after arm 97 has been so moved by the suction motor that the main clutch 4 will be disengaged.

The arms 30 and 66 which are pinned, respectively, to the outer ends of shafts 27 and 43, are manually actuated by a single handle or lever. This handle 135 is mounted below the steering wheel 136 at the upper end of steering column 137 and secured to the upper end of shaft 138. At its upper end the shaft is journaled in a bracket 139 of the steering column and at its lower end is journaled in a bracket 140 at the base of the steering column. The upper end of shaft 138 carries a pointer 141 which cooperates with an h-slot in a bracket 142 also secured to the steering column on bracket 139 just below the steering wheel. The shaft 138 is capable of slight reciprocable movement and is normally biased to its lower position by a spring 143 interposed between the lower bracket 140 and a washer 144 on the end of the shaft.

The ends of the h-slot are designated by the indicia "Lo,", "R" and "Hi" and the central cross-over portion is designated by "N." When the pointer 141 is in the cross-over portion of the slot at "N," spring 143 biases shaft 138 downwardly so that the pointer can be moved freely into the end of the slot marked "Hi" by merely moving lever 135 upwardly in the plane in which it lies. If it is desired to move the pointer into the ends of the h-slot marked "Lo" or "R," this is accomplished by lifting up on handle 135 to move the shaft upwardly and then moving it up or down as desired.

Mounted on the lower end of shaft 138 between the portions of bracket 140, are two arms 145 and 146 having interposed between their hubs a collar 147. The hubs of arms 145 and 146 are provided with slots 148 and 149, respectively, and for cooperation with these slots is a pin 150 carried by shaft 138. The slots 148 and 149 will be in alignment when shaft 138 is in the position where the pointer is opposite the letter "N." The pin 150 will be in slot 148 due to the position of shaft 138 as controlled by the spring 143. Thus it is seen that under these conditions arm 145 is connected to the shaft and it will be rotated by the shaft when the handle is so moved that the pointer enters the "Hi" end of the h-slot. If the shaft is moved upwardly from the position shown in Figure 3, pin 150 will be positioned in slot 149 and arm 146 can then be rotated by handle 135, its direction of rotation depending upon whether the handle is moved into the end of the h-slot marked "Lo" or the end of the h-slot marked "R." The arm 145 is connected by a link 151 to arm 43 carried by shaft 63 on the transmission cover, and arm 146 is connected on a link 152 to arm 30 by the outer end of shaft 27.

From the manually-operated structure just described it will be apparent that when the handle 135 is moved so that pointer 141 is in the "R" end of the h-slot, gear 22 will be moved rearwardly by the shifting fork 29 so that the change speed gearing will be in reverse ratio condition. When the handle 135 is so moved that pointer 141 is in the end of the h-slot marked "Lo," gear 22 will be moved forwardly so as to mesh with gear 26 and thereby place the change speed gearing in low speed ratio. When handle 135 is so moved that the pointer is in the end of the h-slot marked "Hi," shaft 43 will be rotated in a counter-clockwise direction, as viewed from the exterior of the cover plate. This counter-clockwise rotation of shaft 43 will cause the lever 46 pinned thereto on the inside of the closure plate to be moved rearwardly and to the position shown in Figure 12. This movement of the lever will also result in the valve element 67 of the main control valve M to be moved so as to connect the rear end of the suction motor to the source of suction and thereby cause the piston to be moved to the rear end of its cylinder.

Referring now to the carburetor 2 and the mechanism associated therewith, and particularly to Figures 35 to 44, said carburetor is provided with the usual intake passage 153 with which is associated the primary butterfly throttle valve 154 mounted on pivot pin 155 and a secondary butterfly throttle valve 156 mounted on pivot pin 157. In order that conduit 81 leading to the suction motor may be placed in communication with the intake manifold at a point below the secondary throttle valve, there is provided a solenoid-controlled valve generally indicated by the letter S. This valve comprises a casing 158 having a chamber 159 in constant communication with conduit 81. A passage 160 places chamber 159 in communication with the intake passage 153 and a passage 161 places said chamber in communication with the atmosphere by way of passage 162. Passages 160 and 161 are controlled by a single valve element 163 which is mounted on a stem 164 extending through the passages. This stem is connected to the armature 165 of solenoid 166 contained in a non-metallic housing attached by two cap screws to the casing 158. The cap screws also serve to secure the two solenoid terminals in their correct positions and are properly insulated from casing 158 by non-metallic inserts into which the cap screws are threaded and by the mounting flange of the solenoid housing. A spring 167 normally biases the armature of the solenoid, if said solenoid is de-energized, to a position where valve element 163 closes passage 160 and permits conduit 81 to be in communication with the atmosphere through passage 161. When the solenoid is energized, the valve element is moved against the action of the spring to a position where passage 161 is cut off and passage 160 opened so that the conduit 81 can communicate with the intake passage 153 of the carburetor.

The stem 164 controls the secondary throttle valve by connecting means in chamber 168 which communicates with the intake passage by holes 168'. The inner end of said stem is provided with an enlarged end 169 for operating a lever 170 pivoted to the wall of chamber 168. This lever is formed with teeth 171 for engaging the teeth of a gear 172 fixed to the end of pivot pin 157 of the secondary throttle valve. A spring 173 is connected to an arm 174 on said pin and biases the throttle valve to a normally full open position, as shown in Figure 36. The secondary throttle valve will only be open when the solenoid is de-energized. When the solenoid is energized, as shown in Figure 35, rod 164 will so operate lever 170 that the throtle valve will be moved to a closed position, as shown in Figure 35. Thus it is seen that when the solenoid-controlled valve S is in such a condition that conduit 81 is in communication with the intake passage, the secondary throttle valve will be closed and thereby insure that the engine will idle and maximum suction effect will be present. Whenever the solenoid is de-energized so as to connect conduit 81 with the atmosphere, the secondary throttle valve will be in full open position and have no effect in controlling the intake passage.

The primary throttle valve 154 is adapted to be actuated by accelerator pedal 175 pivotally mounted on the floorboard 176 in the operator's compartment of the motor vehicle. The connection between the throttle valve and the accelerator pedal comprises a bell-crank lever 177 pivoted on the engine. One of the arms 178 of said lever is connected to the pedal by a rod 179. Another arm 180 is connected by a link 181 to a lever 182 centrally pivoted on the outer end of pin 155 of the primary throttle valve 154. A third arm 177' is connected by a rod 121' to the previously mentioned arm 121 mounted on collars 117 and 118. The lever 182 carries a leaf spring 183 which forms a yieldable connection between pin 155 and the lever. This yieldable connection is such that valve 154 will be moved simultaneously with the lever between its fully closed position and its fully open position. When it reaches one of these positions, leaf spring 183 will yield to permit the lever 182 to have an additional movement relative to the throttle valve 154. The throttle pin has fixed thereto an arm 184 which is provided with spaced shoulders 185 and 186 which cooperate with a fixed stop 187. These shoulders and the stop determine the closed position and open position of the throttle valve. When the shoulder 185 engages stop 187, the throttle valve will be closed as shown in Figure 35. When shoulder 186 engages the stop, the throttle valve will be opened as shown in Figure 38.

The bell-crank lever 177 has associated therewith a spring 188 which normally biases a shoulder 189 on the bell-crank lever against a stop 190. When this stop is engaged by the shoulder, the accelerator pedal will be in its fully released position and the throttle valve will not only be held closed wherein the shoulder engages the stop 187, but lever 182 will be moved beyond the closed position of the throttle valve and the leaf spring 183 flexed, all as shown in Figure 35. When the accelerator pedal is depressed completely to the floorboard, the throttle valve 154 will be fully open and lever 182 will be moved relatively to the throttle valve as permitted by the flexing of leaf spring 183. This condition is shown in Figure 38. Thus it is seen that the accelerator pedal is capable of a limited movement at each end of its path of movement which movement will not affect the operation of the throttle valve. In other words, the throttle valve will be closed before the accelerator pedal is completely released and the throttle valve will be fully opened before the accelerator pedal reaches the floorboards.

This limited movement of the accelerator pedal without operation of the throttle valve is employed to control a double switch which is associated with the carburetor, generally indicated by the letter A and hereinafter referred to as the accelerator pedal selector switch. This selector switch is capable of controlling two circuits and comprises two terminals 191 and 192 extending into a bore 193 in casing 194 mounted on the side of the carburetor above the primary throttle valve 154. These terminals 191 and 192 are insulated from the casing as shown in Figure 36. Within the bore 193 is a piston 195 carrying on its head a downwardly extending flexible conductor element 196 which is adapted to selectively engage with the inner ends of the two terminals, said terminals being spaced apart such a distance that the element 196 can be positioned between them without contacting either one. The free end of the flexible contact element 196 is forked and carries a cross-pin 197 adapted to be received between the prongs of the forked end 198 of lever 199 pivotally secured to a shaft 200 extending to the exterior of the bore. Secured to the outer end of this shaft is a plate 201 having an arcuate slot 202 therein. Slot 202 receives pin 203 carried on the upper end of lever 182 which operates the throttle valve 154. The plate 201 is normally held in its central position by contact element 196 carried by piston 195, and when the plate is in this position the slot 202 is of such length and so arranged that the throttle valve 154 may be moved by lever 182 and the accelerator pedal to its fully open or fully closed position without the pin 203 engaging an end of the slot. If, however, the lever 182 is caused to move beyond the closed position of the throttle valve 154 as would be the case if the accelerator pedal is fully released, pin 203 will engage the right hand end (as viewed from the exterior) of the slot 202 and cause a clock-wise rotation of the plate and the shaft 200. This will result in contact element 196 being flexed so that it is brought into contact with terminal 191, thus closing a circuit to be later described. If the accelerator pedal should be pressed completely to the floorboard and to a position beyond that required to fully open the throttle valve 154, pin 203 will engage the left hand end of slot 202 and so rotate plate 201 that the flexible contact element 196 will be brought into contact with terminal 192, thereby closing a circuit which will also be later described. This closing of the circuit is shown as taking place when the accelerator pedal is moved to a position beyond full open position of valve 154, but such circuit closing can be accomplished at any point which is substantially near the full open position of valve 154.

The end of bore 193 above piston 195 is connected by a passageway 204 with the intake passage of the carburetor above the throttle valve 154. A spring 205 normally biases piston 195 downwardly and against the inner end of insulation 206 of terminal 192. When the piston is caused to move upwardly against the bias of spring 205, as would be the case if a certain degree of suction were present in the portion of the bore above the piston, the contact element 196 will be raised with the piston, such position being shown in Figure 41. Under these conditions the inner end of the terminal 192 cannot be contacted by the contact element 196 due to the fact that the inner end of said terminal 192 is cut away, as shown at 207 in Figure 44, so that the contact element can move over the top of said terminal. The end of the other terminal 191 is not cut away and it, of course, can be engaged by the contact element in all positions of the piston. Since the carburetor is made of conducting material, contact element 196 will always be connected with ground.

The solenoid-operated valve S is adapted to be controlled by two circuits which are generally indicated by the circuits X and Y. The circuit X includes a clutch pedal controlled switch C and the portion of the accelerator pedal selector switch A comprising the terminal 191 and the contact element 196. The circuit X, which is best shown in Figure 49, includes a conductor 208 leading from the solenoid to the switch C. A second connector 209 leads from switch C to the terminal 191 of the accelerator selector switch. The other terminal of the solenoid is connected by a conductor 210 to the usual junction box 211 of the automobile ignition system. This junction box is in turn connected in the usual manner by conductors 212 and 213 to battery 214, there being an ignition switch 215 interposed between conductors 212 and 213. Since one terminal of the battery 214 is grounded, as is also the contact element 196 of the selector switch, it is seen that the circuit will be closed and the solenoid energized if the ignition switch is closed, switch C closed, and contact element 196 is in engagement with terminal 191.

The other circuit Y for the solenoid includes a limit switch generally indicated by the letter B and mounted on the forward end of the closure plate. One terminal of this switch B is connected by a conductor 215' to conductor 208 leading to the solenoid. The other terminal of said switch is connected by a conductor 216 with terminal 192 of the accelerator selector switch A. The rest of this circuit from the solenoid to the battery is the same as circuit X and comprises the conductor 210, junction box 211, conductors 212 and 213, and the ignition switch 215. Thus it is seen that if the switch B is closed and contact element 196 is in engagement with terminal 192, the circuit Y will be closed and the solenoid energized.

The clutch pedal controlled switch C, which is mounted on the engine, is shown in detail in Figures 30 and 31. This switch comprises a casing 219 in which is mounted a shaft 220 carrying a cam 221 of non-conducting material. The outer end of the shaft carries an arm 222 which is connected by a link 223 with the previously referred to downwardly extending arm 105 on the clutch pedal. The casing 219 carries a fixed terminal 224 insulated from said casing and connected to conductor 208. The casing also carries a yieldable terminal 225 which lies between cam 221 and the fixed terminal 224, said yieldable terminal being connected to the conductor 209. When the clutch pedal is in its fully released position, which is determined by the pull of spring 100 when the foot is off the pedal, terminals 224 and 225 of the switch C will be disengaged and the switch will be open. If the clutch pedal is depressed slightly, as indicated by the dotted line position shown in Figure 1, cam 221 of the switch will be so moved that the contacts will be closed, thus closing switch C. The cam is so formed that the switch will remain closed when the clutch pedal is moved beyond the position indicated in dotted lines as in Figure 1. It is only when the clutch pedal is in fully released position that the switch C is open.

The switch B, which forms part of circuit Y and is mounted on the closure plate, is shown in detail in Figures 26 to 29. This switch is adapted to be so mounted as to be actuated by the upper arm 113 of the double arm lever 112 secured to the end of shaft 31 and, as previously described, employed in moving the shifting fork 33. The switch B comprises a casing 226 to which is secured a stationary contact element 227 which has connected thereto conductor 216'. Also secured to the casing is a second stationary contact element 228 which has connected thereto conductor 216. Within the casing are two telescopically arranged elements 229 and 230, the element 229 carrying conductor element 231 which projects on opposite sides thereof for engaging contact elements 227 and 228 to electrically connect conductors 216 and 216. The elements 229 and 230 are supported in the casing for relative sliding movement by having their outer ends extending through the walls of the casing. A spring 232 biases element 229 to the position where contact 231 will be disengaged from contacts 227 and 228, such condition being shown in Figure 27. The element 230 has its outer end in a position to be engaged and actuated by arm 113 of the double arm lever 112. A spring 233 is interposed between the two elements and normally maintains the element 230 biased outwardly. This spring 233 is weaker than spring 232. The arrangement is such that when double arm lever 112 is in a position corresponding to the neutral position of shifting fork 33 or in a position corresponding to high speed operative position, switch B will be closed. The neutral position of the double arm lever 112 is shown in full lines in Figure 26 and the high speed position is shown in the dotted line position of the same figure. When the double arm lever 112 is in a position corresponding to second speed ratio, as shown in Figure 27, switch B will be opened under the action of spring 232. Spring 233 will also expand to cause the telescopic element 230 to follow up arm 113 of the double arm lever. When the double arm lever is in its neutral position or high speed condition, spring 233 will be so compressed by the inward movement of the telescopic element 230 that spring 232 will also be compressed sufficiently to place the movable contact element 231 in engagement with the stationary contacts 227 and 228.

Referring to the operation of the change speed gearing control means just described in detail, the change speed gearing will be in neutral condition when the parts are in the position shown in Figures 1, 2, 3, 4, 5 and 13. Under these conditions it is to be noted that the accelerator pedal is in fully released position as is also the clutch pedal. The main clutch will, therefore, be engaged. The sliding gear 22 in the gear box will be disengaged from both the gears 20 and 23 and the double clutch element 25 will be at its central position between gears 16 and 24. Thus, although the engine may be driving the gear 16 and the countershaft gears, power cannot be transmitted to the driven shaft 7. The two companion neutralizing levers 45 and 46 will be in their innermost positions adjacent the shifting fork arm 32, such positions being shown in Figure 5. The main control valve M will be in the position shown in Figure 4 wherein the rear end of the suction motor will be connected to atmosphere and the forward end of the suction motor will be in communication with conduit 81 leading to the manifold. The manifold will not be connected to the conduit due to the fact that the solenoid is not energized and valve element 163 is in the position shown in Figure 36. The solenoid is not energized due to the fact that the clutch pedal controlled switch C is open. When the gearing is in neutral position, gear shifting handle 135 and the pointer associated therewith are in the positions shown in Figure 3.

When the change speed gearing is in neutral and it is desired to place it in reverse gear ratio, the main clutch pedal is depressed by the foot to the floorboard to thereby manually disengage the main clutch. When this is done, the shoulder 106 on the clutch pedal picks up lug 107 and so rotates the clutch shaft 13 that the shifting fork 12 will perform the clutch disengaging operation. With the clutch disengaged, handle 135 is pulled upwardly and then moved so as to place the pointer 141 in the end of the h-slot marked "R." This will cause arm 146 at the bottom of the steering column to be connected to shaft 138 and so rotated that the shifting fork 29 will move gear 22 rearwardly into mesh with the idler gear 23. When the clutch pedal is now released, the vehicle will drive in reverse gear ratio. It is to be noted that during the depressing of the clutch pedal, switch C will be closed, thus closing circuit X (contact element 196 being in engagement with terminal 191 due to the accelerator pedal being in fully released position). Although the solenoid 166 is energized and valve element 163 moved to such a position that conduit 81 will be in communication with the intake passage, the suction motor will not be operated since the control conditioning valve M, interposed in the conduit 81 between valve element 163 and the suction motor, is closed. It is also to be noted that the depressing of the clutch pedal to disengage the clutch does not cause any movement of the piston of the suction motor.

When it is desired to place the gearing in low speed ratio, the clutch pedal is manually depressed to the floorboards, thereby disengaging the main clutch. The handle 135 is then manipulated to place the pointer in the end of the h-slot marked "Lo." This will result in shifting fork 29 moving gear 22 into mesh with gear 20. (If reverse ratio has previously been operative it will be made inoperative by the moving of handle 135.) When the main clutch is released, the vehicle may be driven forwardly with low speed operative by depressing the accelerator pedal in the usual manner.

To obtain second speed ratio, the main clutch is again disengaged by depressing the clutch pedal. Next, the handle 135 is moved to place the pointer 141 in the end of the h-slot marked "Hi." (If the gearing is in low speed ratio, this movement of the handle will first cause disengagement of gear 22 from gear 20.) When the pointer is opposite the cross-over portion of the slot marked "N," shaft 138 will be pulled downwardly by spring 143 to thereby cause it to be connected with arm 145. As pointer 141 is moved into the end of the h-slot marked "Hi," arm 145 will be so rotated as to cause shaft 43 journaled in the closure plate to have a clockwise rotation, as viewed from the exterior of the closure plate. This rotation of shaft 43 will cause lever 46 within the closure plate to be swung rearwardly to the position shown in Figure 8. The neutralizing lever 45 will not be moved. Final movement of lever 46 beyond its gear ratio neutralizing range of movement will also cause lever 60 to be rotated therewith and due to its connection with valve element 67 of the main control valve M by means of arm 65, this valve element will be placed in the position shown in full lines in Figures 20, 21, and 22. This position of the valve element will result in the rear end of the suction motor being connected to the intake passage and the source of suction. As already noted, the depressing of the clutch pedal will close switch C, thereby closing the circuit X and causing the solenoid controlled valve to be in the position shown in Figure 37 wherein conduit 81 communicates with the intake passage through the open restricting valve 86. The forward end of the suction motor will be connected to atmosphere. Thus it is seen that the piston of the suction motor will be moved rearwardly by the differential pressure acting thereon.

When the movement of the piston of the suction motor reaches a point toward the end of the cylinder which is substantially two-thirds of the length of the cylinder, arm 97 will be so rotated that arm 128 extending upwardly therefrom will have moved the link 129 to the position shown in Figure 7. This will bring pin 130 on the end of said link 129 to the position where it is about to contact the V-shaped cam 126. This cam will be in the position shown in Figure 7 so that the apex 127 lies above the path of the line of movement of the pin. The reason that the cam is in this position is that shaft 44 normally rests in the position shown in Figure 5 when the gearing is in either neutral position or in low or reverse position. Under these conditions arm 32 which carries the shifting fork 33 is in neutral position.

It is to be noted that the position of the V-shaped cam 126 is controlled by the position of shaft 44 due to its geared connection thereto through arm 52 and the cooperating teeth thereon and on the collar 118, which collar is connected to the collar 117 having the V-shaped cam. Thus, with the V-shaped cam in the position shown in Figure 4, the continued movement of the piston of the suction motor to the end of the cylinder will result in the pin on link 129 being guided into recess 116 of the double arm lever 112 and thereby connected to arm 115 of said double arm lever. The double arm lever will be given a clockwise rotation, thereby rotating shaft 31 and causing the shifting fork 33 to move the double clutch element 25 rearwardly and cause the second speed gear 24 to be clutched to the driven shaft. The gearing will thus be in second speed ratio.

As shaft 31 is rotated to move the shifting fork, arm 32 on said shaft (which arm carries the shifting fork) will be moved rearwardly from its neutral position shown in Figure 8 to a position shown in Figure 10. The movement of arm 32 will cause cam 55 at the bottom thereof to contact cam 50 carried by the member 49 on shaft 44 and thereby rotate said shaft 44 in a clockwise direction, as viewed in Figure 8 from inside the closure plate, and to the position shown in Figure 10. The rotation of shaft 44 will, by means of arm 56 and gear teeth 57 and 125, cause such a clockwise rotation (as viewed from the exterior of the closure plate) of collar 117 and V-shaped cam 126 that its apex 127 will lie below the path of movement of pin 130 on the end of link 129. The positions of the parts on the exterior of the closure cover after the shift to second speed ratio has been made are shown in Figure 9, said main clutch still being in disengaged position.

If the foot is now removed from the main clutch pedal and the accelerator slightly depressed, the clutch will be automatically re-engaged and with the proper smoothness. The removal of the foot from the clutch pedal will permit the clutch pedal to assume its fully released position without permitting the main clutch to become engaged. When the clutch pedal is fully released, the switch C will be open and the circuit X broken. The solenoid will thus be deenergized and the forward end of the suction motor caused to be connected to the atmosphere as a result of the solenoid-controlled valve element 163 assuming the position shown in Figure 36. This is brought about as follows:

It is to be noted that when the accelerator pedal is in fully released position, arm 121, freely rotatable on shaft 31, is in the position shown in Figure 1 and also as shown in Figure 19. The restricting valve 86, which is controlled by the lever, is in full open position. As the accelerator pedal is depressed, the circuit X will be broken and the solenoid valve S allowed to connect the suction motor to atmosphere. This same depressing of the accelerator will also cause arm 121 to be moved and the end of the restricting valve 86 will be pushed out of recess 122 and onto the surface 124, thus causing the restricting valve to assume closed position against its fiber seat. Since the forward end of the suction motor has been connected to atmosphere, the closing of this restricting valve will result in the air which is in the forward end of the suction motor to be trapped and then as the accelerator pedal is continued to be depressed to be slowly bled to the atmosphere due to the opening of the restriction caused by said valve. Thus the piston of the suction motor will be pulled slowly forward by the action of the clutch engaging spring 11 so that the elements of the clutch will be smoothly engaged. The movement of the piston of the suction motor controls the re-engagement of the main clutch and this re-engagement is effected through the link 98 and shaft 100 which is parallel to the main clutch shaft 13. Due to the leverage arrangement shown, the clutch engaging spring 11 must first act through a very low leverage to pull the piston of the suction motor toward the forward end of the cylinder. It is to be noted by reference to Figure 17 that this clutch engaging spring must act through the short arm between pin 103 and the axis of shaft 100 and also through the short arm between the pivotal connection of link 98 and the axis of arm 97. This leverage, however, results in the reverse condition when the piston 93 disengages the clutch. When the clutch becomes fully engaged, the vehicle will be moving forward in second speed ratio.

When it is desired to place the change speed gear in high speed ratio, all that is necessary to be done is to fully release the accelerator pedal 175 and to slightly depress the clutch pedal to the extent shown in dotted lines in Figure 1. It will not be necessary to do anything with the gear shift handle 136 as it will remain in the position where the pointer is in the end of the h-slot marked "Hi." When the accelerator pedal is fully released, the yieldable contact element 196 of the selector valve A will engage the terminal 191. Slight depressing of the clutch pedal will close the switch C. The circuit X will now be closed and the solenoid energized so as to cause the solenoid control valve element 163 to be moved to the position shown in Figure 35. The rear end of the suction motor will thus be connected to the intake passage and piston 93 thereof moved to the rear end of the cylinder. The movement of the piston over two-thirds of the length of the cylinder will result in disengagement of the main clutch by means of arm 97, link 98, shaft 100 and the eccentric pin 103 which cooperates with the rear side of one of the arms of the clutch fork 12.

As soon as the clutch is disengaged, pin 130 of link 129 will be moved into engagement with the V-shaped cam 126 and since the apex thereof is below the path of movement of the pin, as shown in Figure 9, the pin will be guided into the recess 114 and engage with arm 113 of the double arm lever 112. Continued movement of the suction motor piston to the rear end of the cylinder will rotate shaft 31 and cause the shifting fork 33 to move the double clutch element 25 from the position where the gear 24 is clutched to the driven shaft 7 to the position where the driven shaft is directly connected to the driving shaft 5. This will place the change speed gearing in high speed ratio. The movement of the shifting fork 33 to the position shown in Figure 12 will result in cam 55 on the bottom of said arm 32 to be moved away from cam 50, thus permitting spring 53 to rotate shaft 44 in a counter-clockwise direction, as viewed from the inside of the cover plate (Figure 12) in order to reset the V-shaped cam 126 on shaft 31 so that the apex 127 lies above the normal line of travel of pin 130 on the end of link 129. The position of the cam 126 is shown in Figure 11, wherein the main clutch has been disengaged and the high speed ratio has just been caused to be operative as a result of the movement of the piston of the suction motor to the rear end of the cylinder.

When the foot is taken off the clutch pedal, and it is permitted to assume fully released position, and the accelerator is depressed, the main clutch will be engaged in the same manner as previously described in connection with obtaining second speed ratio. Release of the clutch pedal will open the switch C, thereby breaking the circuit X and depressing of the accelerator pedal will speed up the engine and cause a smooth engagement of the main clutch by a slow return of the piston of the suction motor to the forward end of its cylinder.

With the change speed gearing in high speed ratio, the apex of cam 126 will be so positioned that if the suction motor is again operated, the change speed gearing will be shifted from high speed ratio back to second speed ratio. If second speed ratio is desired, all that need be done is to release the accelerator pedal and slightly depress the clutch pedal. This will cause a shift to be made back to second speed ratio. Release of the clutch pedal and depressing of the accelerator pedal will re-engage the main clutch and the vehicle can then be driven in the second speed ratio. To go back to high speed ratio, the same procedure is carried out. Thus it is seen that when the gear shift lever has once been placed so that the pointer is in the end marked "Hi" of the h-slot, second and high speed ratio may be alternately obtained at will without the necessity of moving the gear shift handle 135. All that need be done to make a shift is to release the accelerator pedal and slightly depress the clutch pedal and then remove the foot from the clutch pedal.

If the car should be brought to a stop when the change speed gearing is in high speed ratio and it is desired to proceed in second speed ratio, second speed will automatically be obtained as soon as the clutch pedal is released. When the vehicle is brought to a stop, it is only necessary to depress the clutch pedal a small amount in order to disengage the main clutch.

In addition to being able to change the gearing from high speed ratio to second speed ratio by releasing the accelerator pedal and slightly depressing the clutch pedal and then releasing it, this shift may be accomplished solely by depressing the accelerator pedal to the floorboard. When this is done, the contact element 196 will be caused to engage terminal 192, thus closing the circuit Y. It is to be noted that when the gearing is in high speed ratio, the double arm lever 112 is in such position that the limit switch B mounted on the closure plate is closed. The closing of the circuit Y energizes the solenoid and so operates the solenoid control valve S that the rear end of the suction motor will be placed in communication with the manifold and the piston operated. The movement of the piston of the suction motor to the rear end of the cylinder first disengages the clutch and then operates the double arm lever so as to shift the double clutch element 25 from the high speed operative position to the second speed operative position.

The operation of the solenoid to place the solenoid control valve in the position shown in Figure 35, also results in the secondary butterfly valve 56 being closed. Therefore, it is seen that the intake passage is closed, notwithstanding the fact that the main primary butterfly valve controlled by the accelerator pedal is in open position due to the fact that the accelerator pedal has been moved to the floorboard. Release of the accelerator pedal will now cause the circuit Y to be broken by a movement of the contact element 196 out of engagement with terminal 192. As soon as this circuit is broken, the solenoid will be de-energized and both ends of the suction motor connected to atmosphere. The main clutch will then become re-engaged under the action of its engaging spring. When the accelerator pedal is depressed to the floorboard, lever 121, which controls the restricting valve 86, will be in the position shown in Figure 20. The restricting valve is thus in open position. When the accelerator pedal is initially released, the restricting valve will be closed as shown in Figure 21. Further release of the accelerator pedal places the restricting valve in the position shown in Figure 22. Thus it is seen that during the release of the accelerator pedal the conduit through which the air in the suction motor is forced to atmosphere is restricted, thereby slowing up the clutch engaging movement of the piston so as to cause a smooth engagement of the clutch. The control of the restricting valve is the same as when the accelerator pedal is moved from its fully released position.

The ability to cause a kickdown shifting operation as just described from high speed ratio to second speed ratio by fully depressing the accelerator pedal to the floorboard is very advantageous when it is desired to make a quick shift to second speed ratio in climbing a hill or in going around another vehicle. It is also very convenient in obtaining second speed ratio whenever it is desired. For example, if the vehicle is brought to a stop in second speed ratio and it is desired to start again in second speed ratio, this can be done by fully depressing the accelerator pedal. If this were not done, the shift would be made to high speed ratio upon release of the clutch pedal which, of course, would not be the speed ratio desired.

The shifting of the change speed gearing from high speed ratio to second speed ratio by depressing the accelerator pedal to the floorboard can only be accomplished when the speed of the vehicle is below a predetermined speed such as, for example, 35 or 40 miles per hour. This limitation on such method of shifting is accomplished by means of piston 195 upon which the contact element 196 of the selector switch A is mounted. The piston 195 will be moved upwardly when the throttle valve opening and the speed of the engine are such that the velocity of the carbureted mixture through the intake passage will create a sufficient sub-atmospheric pressure in the upper end of the bore that a differential fluid pressure will be acting on the piston to move it in said upwardly direction. The differential fluid pressure to create the movement must be great enough to overcome the bias of the spring 204. Figure 36 shows the piston in its lower position and Figure 40 shows it in the upper position. When the piston is in the upper position the contact element 196 cannot engage the terminal 192 and, therefore, regardless of whether the accelerator pedal is pressed to the floorboard, the circuit Y cannot be closed and thus no shift can be made. By putting this limitation on the ability to shift to second speed ratio by fully depressing the accelerator pedal, there is no danger of making a shift to second speed ratio when such is not desired, as, for example, when the vehicle is traveling above a certain speed.

Figure 5:
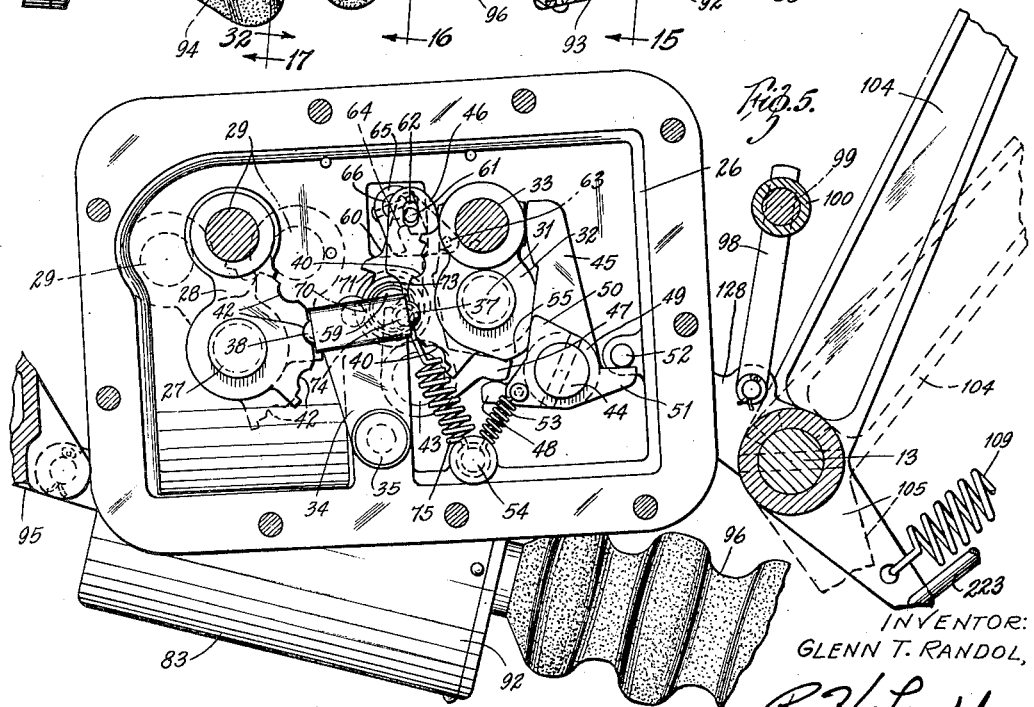
Figure 5 is a view of the parts on the inside of the transmission closure plate showing them in positions corresponding to those on the exterior of said plate, as viewed in Figure 4.

When it is desired to neutralize the change speed gearing after driving the vehicle in either second or high speed ratio, all that need be done is to fully depress the clutch pedal by the foot so as to hold the main clutch disengaged and then to move the gear shift handle 135 to a position where the pointer 141 is opposite "N." This positively neutralizes the transmission by manual effort. When the handle 135 moves so that the pointer 141 is at "N," the shaft 43 will be rotated in a counter-clockwise direction, as viewed from the exterior of the closure plate. This will result in the neutralizing lever 46 being initially moved toward neutralizing lever 45, until the projection 47 on lever 46 engages the projection 48 on lever 45 (see Figuure 12) following which both levers 45 and 46 will move simultaneously toward each other to neutralize either second or high speed ratio to correspond with the setting of the pointer 141 at "N." When the neutralizing levers are moved simultaneously toward each other, arm 32 carrying the shifting fork 33 will be moved to its neutral position and thereby place the double clutch element 25 in its central disengaged position. Regardless of whether the clutch element 25 is in high speed ratio position or second speed ratio position, it will be returned to its central neutral position by the neutralizing levers. The movement of the neutralizing levers toward each other will be assisted by the action of spring 75 as soon as lever 46 has been initially moved sufficiently that the spring is "over center." When lever 46 is moved inwardly, valve element 67 of the main control valve M will be moved to the position shown in Figure 4 to thereby connect the rear end of the suction motor to atmosphere and the forward end to conduit 81 leading to the intake manifold. This cutting off takes place prior to any "picking up" and moving of the gear shifting fork 33 toward neutral position by manual effort. Also, the return of levers 46 and 45 to neutral position, as shown in Figure 5, will cause cam 126 to be so positioned, if not already in such position, that the apex thereof will lie above the path of travel of pin 130 so that whenever the gear shift handle is again set that the pointer is in the "Hi" end of the h-slot, the speed ratio which will be obtained will be second.

It is also to be noted that when the valve element 67 of the conditioning control valve M is moved to cut off position during manual neutralizing of any speed ratio, the forward end of the power cylinder will be connected to the manifold since it is to be noted that the circuit X is closed, due to release of the accelerator pedal and full depression of the clutch pedal. The piston of the suction motor will thus be pulled forwardly to its normal position assumed when the clutch is engaged, notwithstanding the clutch remains disengaged due to the depressed condition of the clutch pedal. When the clutch pedal is released by the foot, after obtaining neutralization by movement of the handle 135 to "N" position, the clutch then will become engaged. Thus it is seen that if the gearing is neutralized, as set forth, there is no possibility of leaving the car with the clutch disengaged and the gearing engaged. The operations performed are identical to manual operations already implanted in the driving public's mind by years of controlling standardized manually actuated gearing and clutches. This is a very important feature since in some power operated clutches and shifting mechanisms it is possible for the operator not to obtain, by performing the usual manual operations, neutralization of the gearing or the relieving of the power from the power cylinder so that the clutch will be engaged when he leaves the vehicle.

Referring now to the modified control means whereby the selection of the second speed ratio and the high speed ratio is determined directly by the position of the accelerator mechanism, similar parts to those already described are designated by similar reference characters. The main control conditioning valve is designated by the letter M' and is enclosed with a casing 69' mounted on the top portion of the closure plate 26. This casing is provided with bore 68 within which is positioned the control valve element 67 of a construction identical with that of the previously described main control valve M and being provided with cross-passage 76 and the parallel surface slots 77 and 78 on opposite sides thereof. The valve element 67 is carried on stem 66 which extends into the inside of the closure plate and is actuated by means of the short arm 65 through a mechanism which has already been described. The valve element 67 is shown in detail in Figure 55. In the modified construction the valve element is provided with a second stem 234 which extends from the exterior of the end of bore 68 so as to project out of the casing. On the end of this stem 234 is an arm 235 which carries a pin 236 on its free end which engages in slot 237 of lever 238 pivotally mounted on casing 69' by a pin 239. The lever 238 carries an extension 240 which projects toward the closure cover for controlling structure which will be later referred to.

The bore 68 in the valve casing is connected to conduit 81 leading to the suction manifold by passage 79' and to conduit 82 leading to the rear end of the combined clutch actuating and gear shifting suction motor 83 by way of a passage 89' in the valve casing. The valve casing has atmospheric passages 88' and 89', passage 89' being connected with passage 88' by a short pipe 241 (Figure 51). The conduit 85 leading from the forward end of the suction motor 83 is connected to bore 68 of the valve element by a passage 84'.

Associated with passage 84' is a restricting valve 86' normally biased to an open position by a spring 87'. This restricting valve is similar to the restricting valve 86 previously described in connection with the gear shifting structure shown in Figures 1 to 49 but is provided with a V-shaped end instead of a round end. This restricting valve is adapted to cooperate with a cam 242 on arm 121 which is connected to the accelerator mechanism by rod 121' in the same manner as arm 121 of the structure shown in Figures 1 to 49. The cam 242 is provided with a V-shaped recess 243 and end surfaces 244 and 245 which are struck on a radius so that the shaft 31 is at the center, said shaft being the same one upon which arm 121 is rotatably mounted. The arm 121 has integral therewith a collar 246 which is provided with a V-shaped cam 126', said cam taking the place of the V-shaped cam 126 in the previously described shifting mechanism and performs the selecting function for determining to which arm of the double arm lever 112 the pin 130 will be connected when the suction motor is operated toward clutch disengaged position. The V-shaped cam 126' has an apex 127'.

The valve casing is also provided with a passage 247 which communicates with valve bore 68 and is parallel with and lies between passages 84' and 89' (See Figure 54). Intersecting passages 89', 247, and 84' is a bore 248 in which is mounted a hollow plunger 249. The lower end of the bore is provided with an opening 250 leading to atmosphere. Cooperating with this opening is a ball check valve 251. Interposed between the ball check valve and the plunger and lying within the plunger is a spring 252 for biasing the ball check valve to a position closing the opening 250. The upper end of the plunger which projects out of bore 248 is adapted to lie beneath the extension 240 on lever 238, previously referred to, so as to be controlled by said lever. This extension, by means of the lever, can push the plunger 249 inwardly and cause it to engage the check ball 251 and positively hold it on its seat and at the same time connect the engine intake manifold through valve slot 78, passage 247 and ports 253 and 254 to the forward end of the suction motor whereby special operating advantages result, as will be described. This condition is shown in Figure 54. When the extension 240 is moved away from the end of plunger 249 to the dotted line position shown in Figure 54, or in full lines in Figure 50, spring 252 can cause the plunger to follow the extension and under such conditions the spring only will hold ball 251 on its seat to close opening 250. Under such conditions air can flow past the ball from the atmosphere but not in the opposite direction. When the plunger is in engagement with the ball and holding it on its seat, it will be impossible for air to flow in either direction through opening 250. The plunger 249 is provided with an opening 253 in its wall so as to place the passage 247 in communication with the interior of the plunger when the plunger is engaged with the check ball 251. The plunger is also provided with a second opening 254 in its wall for placing conduit 85 in communication with the interior of the plunger when the plunger is held in a position to engage the check ball.

When the structure shown in Figures 50 to 56 is embodied in the control mechanism, it will not be necessary to employ cam portion 55, cam portion 50, member 49, and extension 51 thereon, and spring 53, all as shown in Figure 5 previously described. The lever 45 of the companion levers 45 and 46 is loosely mounted on pin 44', as shown in Figure 50, which takes the place of shaft 44 of the previously described structure. The arm 56 mounted on the exterior of shaft 44, and collars 117 and 118 mounted on the exterior of shaft 31, are also eliminated when the structure shown in Figures 50 and 56 is employed since the selecting cam 126' is directly actuated by the accelerator mechanism. When the structure of Figures 50 to 56 is employed in the gear shifting mechanism, limit switch B will also be eliminated from circuit Y.

The control valve element 67 in the structure shown in Figure 55 will be in the full line position shown in Figure 54 when the gear shift handle is in the neutral position or being employed to manually engage either low speed ratio or reverse speed ratio. When the gear shifting handle is moved to the "Hi" position, the valve element 67 will assume the dotted line position shown in Figures 50 and 54 by the operation of structure already described in connection with the control mechanism shown in Figures 1 to 49. The opening of valve element 67 will occur after the neutralizing lever 46 is moved to a position beyond the position where it is effective to initiate neutralization, all as previously described.

When valve element 67 is in the position shown in full lines in Figure 54, the rear end of the suction motor will be connected to atmosphere and the forward end of the suction motor will be connected with conduit 81, the connection being by way of conduit 85, the openings 254 and 253 in the plunger and the passage 247 leading to the bore of the valve element and then through the slot 78. This communication is present regardless of the condition of the restricting valve 86' which restricting valve will be closed either when the accelerator is in the fully released position or in a depressed position beyond the operating range of the accelerator mechanism. Even though the accelerator mechanism may be released so as to open the solenoid-controlled valve S and place the forward end of the suction motor in communication with the manifold, the suction motor will not be operated due to the fact that the piston thereof is already in the forward end of its cylinder.

When the control valve element 67 is moved to the dotted line position shown in Figure 54, the rear end of the suction motor will be placed in communication with conduit 81 leading to the manifold by way of the solenoid-controlled valve S. This condition of the control valve element is shown in Figure 50. The lever 238 will be turned to a position so that the plunger 249 will be moved away from the check ball 251 by spring 252. If the accelerator mechanism should be in released position, then under these conditions arm 121 will be in the position shown in Figure 50. This will result in conduit 81 being connected to the engine intake manifold if the solenoid 166 is energized by slightly depressing the clutch pedal to close switch C. The suction motor will now be operated so as to move the piston from the forward end of the cylinder to the rear end. The clutch will be disengaged and the link 129 moved forwardly so that pin 130 thereof will engage the V-shaped selector cam 126'. This cam is in such position that the apex 127' will lie below pin 130 and thus the pin will be guided upwardly so as to engage the arm 113 of the double arm lever 112 to thereby cause a shift to high speed position. Air will be admitted to the forward end of the suction motor during the rearward travel of the piston by way of opening 250 and the check ball since the only thing holding this ball seated is light spring 252. Consequently with the ball check valve arrangement the clutch can be rapidly disengaged as air can enter the forward end of the cylinder through a free flow passage and not through a restricted passage as is the situation in the previously described structure shown in Figures 19 to 22 where air going to the forward end of the cylinder must pass through the small port having the fiber seat for restricting valve 86. The restricting valve 86' will be closed and air cannot pass said valve as the accelerator is in released position.

If the accelerator pedal is now depressed, the circuit X controlling solenoid valve S will be broken and the clutch allowed to engage. The engaging movement of the clutch can be controlled by the extent of opening of the restricting valve 86', said opening depending upon the amount the accelerator pedal is depressed. As the accelerator pedal is depressed, the V-shaped recess 243 will be moved so that the restricting valve can slowly open. Thus the air in the forward end of the cylinder will be bled off and the rapidity of engagement of the clutch controlled. If a rapid engagement of the clutch is desired, the accelerator pedal will be depressed quickly. If a slow engagement of the clutch is desired, the accelerator pedal will be slowly depressed. Air cannot escape through opening 250 due to the fact that the check ball will prevent this.

If second speed ratio should be desired instead of high speed ratio, the clutch pedal will not be slightly depressed and instead thereof the accelerator pedal will be fully depressed to a position beyond its operating range, as shown in Figure 54. This will cause energization of the solenoid 166 through circuit Y, thus connecting the suction motor to the manifold. The depressing of the accelerator pedal will cause the V-shaped cam 126' to have its apex above the path of movement of the pin 130 on link 129. Thus this pin will be guided to engage arm 115 of the double arm lever 112 and thereby cause a shift to second speed ratio condition. When the accelerator pedal is fully depressed, the restricting valve 86' will be closed but, nevertheless, air can enter the front chamber of the suction motor through opening 250 and permit it to operate, the air unseating the ball check valve. Release of the accelerator will now break the circuit Y and cause the clutch to be engaged, the rapidity of engagement of the clutch being determined by the extent of release of the accelerator mechanism as such will control the extent of opening of the restricting valve 86' and the bleeding of air from the forward end of the suction motor.

When it is desired to go to high speed ratio from second speed ratio, all that need be done is to release the accelerator pedal and slightly depress the clutch pedal. This will energize the circuit X and cause the suction motor to again be connected to the engine intake manifold. Since the accelerator mechanism is released, the apex 127' of the V-shaped cam 126' will lie below the path of movement of pin 130 on link 129 and thus the shift will be made into high speed ratio since the pin is guided to connect with arm 113 of the double arm lever 112. When in high speed ratio and it is desired to re-obtain second speed ratio all that need be done is to fully depress the accelerator pedal.

It is to be noted that in this modified structure the second speed ratio can be "skipped" when starting the vehicle in low speed ratio and getting into high speed ratio. With low manually engaged and the vehicle moving, the next step in shifting will be to release the accelerator pedal and disengage the clutch manually. The handle 135 can then be moved to "Hi" to thus disengage the low speed gear and place valve element 67 in the position shown in Figure 50 and the dotted position in Figure 54. Since the accelerator pedal is already released and the clutch depressed manually, the circuit "X" will be closed and, therefore, the suction motor will be operated as soon as valve 67 is placed in the position to connect the suction motor to the manifold. Operation of the suction motor will thus cause a shift to high speed ratio as the selector cam 126' is in the proper position due to the released position of the accelerator pedal. Thus it is seen that "skipping" of second speed ratio is accomplished without any special operation, which is a desirable feature.

In connection with both control mechanisms shown, attention is directed to the ease of control of the vehicle when it is necessary to bring the vehicle to a stop in traffic for some period of time and yet be ready to start rapidly with a minimum of effort. Consider the gearing in high speed ratio when it is brought to a stop. To disengage the clutch, the clutch pedal will be depressed only sufficiently to close switch C. Circuit X will accordingly be energized and the power cylinder operated.

With the control mechanism shown in Figures 1 to 49, the operating of the power cylinder will first cause disengagement of the clutch and then a shift to second speed ratio, all as previously described. The operator then, to start the vehicle, need only depress the accelerator pedal. This will break the circuit X, thus allowing the clutch to engage and power to be transmitted to the gearing which is already in second gear ratio, the one desired under most conditions for starting. Thus it is apparent the ease and simplicity of stopping the vehicle and again starting it is all that could be desired. There is no necessity for straining the foot to hold out any clutch during the stopping time. All that is required is a very slight pressure on the clutch pedal sufficient to hold it forward in its idle path of travel.

In the modified construction shown in Figures 50 to 56, when the power cylinder is operated by slightly depressing the clutch pedal, the clutch will be disengaged but the gearing will remain in high speed ratio. If it is desired to start in this speed ratio, as would be easily possible with a fluid coupling in series with the friction clutch, all that need be done is depress the accelerator pedal, whereupon the circuit X will be broken, the clutch allowed to re-engage and power to be transmitted to move the vehicle. If it should be desired to start in a lower speed ratio, then low speed ratio should be employed. To do this the clutch pedal is depressed completely to the floorboard and the gear shift handle 135 operated to manually establish low speed ratio in the manner already described. After the vehicle is started in this low speed ratio by releasing the clutch pedal and depressing the accelerator pedal, the operator can skip second speed ratio and go immediately to high speed ratio by redepressing the clutch pedal to the floorboard and then putting the gear shift lever in the "Hi" position. Upon release of the clutch pedal and depression of the accelerator pedal the vehicle will be in high speed ratio. If it is found necessary to go through second speed ratio in starting, then of course the clutch pedal will be held to the floorboard, the gear shift handle put in the "Hi" position and the accelerator pedal depressed completely to the floorboard. This will select second speed ratio and the closing of the Y circuit will cause the power cylinder to again operate to accomplish the shift to second speed ratio. Release of the accelerator pedal will then break the Y circuit, allow the clutch to smoothly re-engage and the vehicle to move forwardly in second speed ratio. High speed ratio is then obtained by releasing the accelerator pedal, tapping the clutch pedal to close the circuit X and then again depressing the accelerator pedal to cause the clutch to smoothly reengage and the vehicle to move forwardly in high speed ratio.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a motor vehicle provided with an accelerator mechanism and a change speed gearing having an element capable of assuming two speed ratio positions and a neutral position, means for shifting the element of said gearing alternately between one speed ratio and another, control means for said shifting means including said accelerator mechanism, said means causing the shifting means to place the element of the gearing in one speed ratio when the accelerator mechanism is in released condition and for causing the shifting means to place the element of the gearing in the other speed ratio when the accelerator mechanism is fully depressed, manually-controlled means for moving said element of the gearing to neutral position at will by manual effort, and means controlled by the manually-controlled means when caused to move the element of the gearing to neutral for disabling the shifting means for the two speed ratios.

2. In a motor vehicle provided with an accelerator mechanism, a main clutch and a change speed gearing, means comprising a single power means for disengaging the clutch and for shifting said gearing alternately between one speed ratio and another, control means for said power means including said accelerator mechanism, said means causing the power means to disengage the clutch and place the gearing in one speed ratio when the accelerator mechanism is in released condition and for causing the power means to disengage the clutch and place the gearing in the other speed ratio when the accelerator mechanism is fully depressed, and manually-controlled means for placing said gearing in neutral condition at will and for disabling the power means when the manually-controlled means is operated to neutralize the gearing.

3. In a motor vehicle provided with an accelerator mechanism, a main clutch and a change speed gearing, means comprising a single power means having a movable element connected for disengaging the clutch and for subsequently by successive movements shifting said gearing alternately between high speed ratio and second speed ratio, control means for said power means including said accelerator mechanism, said means causing the power means to disengage the clutch and place the gearing in high speed ratio when the accelerator mechanism is in released condition and for causing the power means to disengage the clutch and shift the gearing from high speed ratio to second speed ratio when the accelerator mechanism is fully depressed, and means operable by the accelerator mechanism and so associated with the power means as to cause the power means to control the rate of re-engagement of the clutch.

4. In a motor vehicle provided with an accelerator mechanism, a main clutch and with a change speed gearing having a member movable to two different speed ratio operative positions, a control mechanism comprising a fluid motor having a movable element, a source of pressure different than atmospheric pressure, means including a control valve for placing one end of the motor in communication with the source so as to cause said movable element to move from one end of its stroke to the other end and for closing said communication so as to permit the return movement of said movable element, means for so connecting the movable element to the movable member of the gearing and to the main clutch that it will disengage the clutch and shift said movable member to an operative position during a stroke of said element in one direction when the motor is connected to the source and will disengage the clutch and shift said member to its other operative position upon a successive similar stroke, and means for opening and closing said control valve by the accelerator mechanism.

5. In a motor vehicle provided with an accelerator mechanism and a change speed gearing having a member movable to two different speed ratio operative positions, a control mechanism comprising a fluid motor having a movable element, means for so connecting the movable element to the movable member of the gearing that successive reciprocations of said element from one position to another and return will cause the movable member to alternately assume its operative positions, a source of pressure different from atmospheric pressure connected to one end of the motor, a control valve, means for opening said control valve when the accelerator mechanism is in a predetermined position shut-off valve means for preventing the control valve from controlling the motor, and manual means for closing the shut-off valve means and neutralizing the gearing.

6. In a motor vehicle provided with an accelerator mechanism and a change speed gearing having a member movable to two different speed ratio operative positions, a control mechanism comprising a fluid motor having a movable element, means for so connecting the movable element to the movable member of the gearing that successive reciprocations of said element from one position to another and return will cause the movable member to alternately assume its operative positions, a source of pressure different from atmospheric pressure connected to one end of the motor, a control valve, means for opening said control valve when the accelerator mechanism is in a predetermined position, a manually-operated means for placing said gearing in neutral condition, and means operated by manual effort transferred from the manually-operated means for disabling the fluid motor when the gearing is placed in neutral condition.

7. In a motor vehicle provided with an accelerator mechanism and a change speed gearing having a member movable to two different speed ratio operative positions, a control mechanism comprising a fluid motor having a movable element, means for so connecting the movable element to the movable member of the gearing that successive reciprocations of said element from one position to another and return will cause the movable member to alternately assume its operative positions, a source of pressure different from atmospheric pressure connected to one end of the motor, a control valve, means for opening said control valve when the accelerator mechanism is in a predetermined position, means including a manually-operated lever for placing the gearing in neutral condition at will and means operable by moving the lever from its neutral condition position for permitting the control valve to function.

8. In a motor vehicle provided with an engine accelerator mechanism and a change speed gearing having associated therewith a main clutch mechanism, means comprising a suction motor for disengaging the clutch and subsequently causing a speed ratio to be operative by a stroke of the movable element of the motor from one position to another in a single direction, a source of suction, means comprising a control valve for alternately placing one end of the motor in communication with the source and with the atmosphere to thus cause the movable element to be reciprocated, and control means for operating said valve, said control means embodying the accelerator mechanism and means so associated with the accelerator mechanism that the engine torque will be relieved and the valve can be positioned to cause the suction motor to shift the change speed gearing from one speed ratio to another speed ratio when the accelerator mechanism is fully depressed to a position substantially at the end of its operating range.

9. In a motor vehicle provided with an engine accelerator mechanism and a change speed gearing having associated therewith a main clutch mechanism, means comprising a suction motor for disengaging the clutch and subsequently causing a speed ratio to be operative by a stroke of the movable element of the motor from one position to another in a single direction, a source of suction, means comprising a control valve for alternately placing one end of the motor in communication with the source and with the atmosphere to thus cause the movable element to be reciprocated, and control means for operating said valve so that the motor will be in communication with the source, said control means being so associated with the accelerator mechanism that the valve can only be in a position to place the source in communication with the motor when the accelerator mechanism is in either a released position or in a similar position and the engine torque relieved when in a fully depressed position substantially at the end of its operating range.

10. In a motor vehicle provided with an accelerator mechanism and a change speed gearing having associated therewith a main clutch mechanism, means comprising a suction motor for disengaging the clutch and subsequently causing different speed ratios to be operative by successive strokes of the movable element of the motor from one position to another in a single direction, a source of suction, means comprising a control valve for alternately placing one end of the motor in communication with the source and with the atmosphere to thus cause the movable element to be reciprocated, and control means for operating said valve, said control means embodying the accelerator mechanism and means so associated with the accelerator mechanism that the valve can be positioned to cause the suction motor to shift the change speed gearing from one speed ratio to another speed ratio when the accelerator mechanism is one predetermined position and then back to the first named speed ratio when the accelerator mechanism is in another predetermined position.

11. In a motor vehicle provided with an accelerator mechanism, a clutch mechanism including a pedal and a change speed gearing, means comprising a fluid motor for disengaging the clutch and changing the speed ratio of the gearing, a source of pressure different from atmosphere for actuating the motor, a control valve, a solenoid for opening the control valve, two parallel electrical circuits for the solenoid each of which includes two switches, means for closing one switch in one of the circuits when the accelerator mechanism is in released position and for closing one switch in the other circuit when the accelerator mechanism is in a fully depressed position, means for closing the other switch in the first named circuit by initial movement of the clutch pedal from its clutch-engaged position, and means for closing the other switch in the second named circuit only when the change speed gearing is in a predetermined condition.

12. In a motor vehicle provided with an accelerator mechanism, a main clutch and a change speed gearing having a member movable to two different speed ratio operative positions, a control mechanism comprising a fluid motor having a reciprocable element, means for connecting the movable element to disengage the clutch by a partial movement thereof of its stroke in one direction, means for connecting the movable element to the movable member so as to move the latter to an operative position during the remainder of the stroke of the movable element, said last named connecting means including means causing alternate movement of the movable member to its two operative positions on successive reciprocations of the element, a control valve, and means for opening said control valve to cause the element of the motor to complete a stroke and thereby disengage the clutch and move the member to an operative position when the accelerator mechanism is in one position and for closing the valve to permit return movement of the element of the motor to thereby re-engage the clutch when the accelerator mechanism is moved to another position, said return movement of the element so conditioning said second connecting means that a subsequent stroke of the element will cause the movable member to be shifted to its other operative position.

13. In a motor vehicle provided with an accelerator mechanism and a change speed gearing having associated therewith a main clutch mechanism, means comprising a fluid motor for disengaging the clutch and subsequently causing a speed ratio to be operative by a stroke of the movable element of the motor from one position to another in a single direction, a source of fluid pressure different from atmosphere, means comprising a control valve for alternately placing one end of the motor in communication with the source and with the atmosphere to thus cause the movable element to be reciprocated, means for operating said valve so that the motor will be in communication with the source when the accelerator mechanism is in a predetermined position, and means operable by the accelerator mechanism when it is moved from its predetermined position for controlling the rate of movement of the movable element of the motor during its return stroke.

14. In a motor vehicle provided with an accelerator mechanism and a change speed gearing having associated therewith a main clutch mechanism, means comprising a fluid motor for disengaging the clutch and subsequently causing a speed ratio to be operative by a stroke of the movable element of the motor from one position to another in a single direction, a source of fluid pressure different from atmosphere, means comprising a control valve for alternately placing one end of the motor in communication with the source and with the atmosphere to thus cause the movable element to be reciprocated, means for operating said valve so that the motor will be in communication with the source when the accelerator mechanism is in a released position and in communication with the atmosphere when the accelerator mechanism is in another position, and means including valve means operable as the accelerator mechanism is moved from its released position for controlling the rate of movement of the movable element of the motor during its return stroke.

15. In a motor vehicle provided with an accelerator mechanism and a change speed gearing having associated therewith a main clutch mechanism, means comprising a fluid motor for disengaging the clutch and subsequently causing a speed ratio to be operative by a stroke of the movable element of the motor from one position to another in a single direction, a source of fluid pressure different from atmosphere, means comprising a control valve for alternately placing one end of the motor in communication with the source and with the atmosphere to thus cause the movable element to be reciprocated, means for operating said valve so that the motor will be in communication with the source when the accelerator mechanism is in a predetermined position and in communication with the atmosphere when the accelerator mechanism is in another position, means comprising a valve for restricting the flow of air between the atmosphere and the motor to thereby control the movement of the movable element during its return stroke, and means operable by the accelerator mechanism for increasing the opening of said restricting valve as the accelerator mechanism is moved from its predetermined position where the first named valve cuts off the source of suction to a position where the suction motor is in communication with atmosphere.

16. In a control mechanism for a change speed gearing having associated therewith a main clutch mechanism, means comprising a suction motor for disengaging the clutch and subsequently causing a speed ratio to be operative by a stroke of the movable element of the motor from one position to another in a single direction, a source of suction, means comprising a control valve for alternately placing one end of the motor in communication with the source and with the atmosphere to thus cause the movable element to be reciprocated, an operator-operated member connected to actuate said valve, means comprising a valve for restricting the flow of air from the other end of the suction motor as its movable element moves during its return stroke, and means for varying the opening of the restricting valve by the operator-operated member of the first named valve when said first named valve is operated to cut off the source of suction.

17. In a motor vehicle provided with an accelerator mechanism and a change speed gearing having associated therewith a main clutch mechanism, means comprising a suction motor for disengaging the clutch and subsequently causing a speed ratio to be operative by a stroke of the movable element of the motor from one position to another in a single direction, a source of suction, means comprising a control valve for alternately placing one end of the motor in communication with the source and with the atmosphere to thus cause the movable element to be reciprocated, means for operating said valve so that the motor will be in communication with the source when the accelerator mechanism is in released position and in communication with the atmosphere when the accelerator mechanism is in another position, means comprising a valve for restricting the flow of air from the other end of the suction motor when its movable element moves during its return stroke, and means for increasing the opening of said restricting valve when the accelerator mechanism is moved from its released position.

18. In a motor vehicle provided with an accelerator mechanism and a change speed gearing having associated therewith a main clutch mechanism, means comprising a suction motor for disengaging the clutch and subsequently causing a speed ratio to be operative by a stroke of the movable element of the motor from one position to another in a single direction, a source of suction, means comprising a control valve for alternately placing one end of the motor in communication with the source and with the atmosphere to thus cause the movable element to be reciprocated, means for operating said valve so that the motor will be in communication with the source when the accelerator mechanism is in a predetermined position and in communication with the atmosphere when the accelerator mechanism is in another position, means comprising a valve for restricting the flow of air from the other end of the suction motor when its movable element moves during the return stroke, and means for increasing the opening of said restricting valve when the accelerator mechanism is moved from its predetermined position to thereby cause the first named valve to cut off the source of suction and place the suction motor in communication with atmosphere.

19. In a motor vehicle provided with an accelerator mechanism, a clutch mechanism and a change speed gearing, a fluid motor for disengaging the clutch and changing the speed ratio of the gearing, a source of pressure different from atmosphere for actuating the motor, a control valve, a solenoid for opening the control valve, two parallel electrical circuits for the solenoid each of which includes two switches, means for closing one switch in one of the circuits when the accelerator mechanism is in released position and for closing one switch in the other circuit when the accelerator mechanism is in a fully depressed position, means for closing the other switch in the first named circuit at will, and means for closing the other switch in the second named circuit only when the change speed gearing is in a predetermined condition.

20. In a motor vehicle provided with an accelerator mechanism and a change speed gearing, a fluid motor for changing the speed ratio of the gearing, a source of pressure different from atmosphere for actuating the motor, a control valve, a solenoid for opening the control valve, two parallel electrical circuits for the solenoid each of which includes two switches, means for closing one switch in one of the circuits when the accelerator mechanism is in released position and for closing one switch in the other circuit when the accelerator mechanism is in a fully depressed position, means for closing the other switch in the first named circuit at will, and means for closing the other switch in the second named circuit only when the change speed gearing is in a predetermined condition.

21. In a motor vehicle provided with an accelerator mechanism, a clutch mechanism and a change speed gearing, a fluid motor for disengaging the clutch and changing the speed ratio of the gearing, a source of pressure different from atmosphere for actuating the motor, a control valve, a solenoid for opening the control valve, two parallel electrical circuits for the solenoid means comprising a switch in each circuit for controlling it, and means for closing the switch in one of the circuits when the accelerator mechanism is in released position and for closing the switch in the other circuit when the accelerator mechanism is in a fully depressed position.

22. In a motor vehicle provided with an accelerator mechanism and a change speed gearing, a fluid motor for changing the speed ratio of the gearing, a source of pressure different from atmosphere for actuating the motor, a control valve, a solenoid for opening the control valve, two parallel electrical circuits for the solenoid means comprising a switch in each circuit for controlling it, and means for closing the switch in one of the circuits when the accelerator mechanism is in released position and for closing the switch in the other circuit when the accelerator mechanism is in a fully depressed position.

23. In a motor vehicle provided with an accelerator mechanism and a change speed gearing, a fluid motor for disengaging the clutch and changing the speed ratio of the gearing, a source of pressure different from atmosphere for actuating the motor, a control valve, a solenoid for opening the control valve, two parallel electrical circuits for the solenoid means comprising a switch in each circuit for controlling it, means for closing the switch in one of the circuits when the accelerator mechanism is in released position and for closing the switch in the other circuit when the accelerator mechanism is in a fully depressed position, a second switch in the second named circuit, and means for closing said second switch only when the change speed gearing is in a predetermined condition.

24. In a motor vehicle provided with an accelerator mechanism, a clutch mechanism and a change speed gearing, a fluid motor for disengaging the clutch and changing the speed ratio of the gearing, a source of pressure different from atmosphere for actuating the motor, a control valve, a solenoid for opening the control valve, an electrical circuit for the solenoid including two switches, means for closing one switch by the accelerator mechanism when in a predetermined position, and operator-operated means for closing the other switch.

25. In a motor vehicle provided with an accelerator mechanism, a clutch mechanism including a pedal and a change speed gearing, a fluid motor for disengaging the clutch and changing the speed ratio of the gearing, a source of pressure different from atmosphere for actuating the motor, a control valve, a solenoid for opening the control valve, an electrical circuit for the solenoid including two switches, means for closing one switch by the accelerator mechanism when in a released position, and means for closing the other switch by an initial movement of the clutch pedal from its clutch-engaged position.

26. In a motor vehicle provided with an accelerator mechanism, a clutch mechanism and a change speed gearing, a single fluid motor for first disengaging the clutch and then for changing the speed ratio of the gearing, a source of pressure different from atmosphere for actuating the motor, a control valve, a solenoid for opening the control valve, an electrical circuit for the solenoid including an accelerator-controlled switch which is closed only when the accelerator mechanism is fully depressed, and means for automatically causing the engine to idle when the accelerator mechanism is fully depressed.

27. In a motor vehicle provided with an accelerator mechanism, a main clutch and a change speed gearing, means comprising a single movable member for first disengaging the clutch and then subsequently shifting said gearing from one speed ratio to another, selecting means between the first named means and the gearing for the shifting means so controlled solely by the accelerator mechanism that one speed ratio will be selected prior to shifting when the accelerator mechanism is in released condition and another speed ratio will be selected prior to shifting when the accelerator mechanism is in depressed condition beyond its operative range, and means for causing said clutch disengaging and shifting means to be operated only when the accelerator mechanism is in the released or in the depressed condition.

28. In a motor vehicle provided with an accelerator mechanism and a change speed gearing having at least two speed ratios, means comprising a fluid motor for shifting a single movable element of said gearing, means for selectively connecting the movable element of the motor to a movable element of the gearing so as to shift the gearing alternately from one speed ratio to another, and means for controlling the selectively connecting means by the accelerator mechanism prior to operation of the motor so that the highest speed ratio can be selected only when the accelerator mechanism is in released condition and the other speed ratio selected only when the accelerator mechanism is in a fully depressed condition.

29. In a motor vehicle provided with an accelerator mechanism and a change speed gearing, means comprising a fluid motor for shifting a single movable element of said gearing, means for selectively connecting the movable element of the motor to a movable element of the gearing so as to shift the gearing alternately from one speed ratio to another, and means for controlling the selectively connecting means by the accelerator mechanism prior to operation of the motor so that one speed ratio can be obtained only when the accelerator mechanism is in one predetermined position and the other speed ratio obtained only when the accelerator mechanism is in another predetermined position.

30. In a motor vehicle provided with an accelerator mechanism and a change speed gearing, means comprising a fluid motor for shifting a single movable element of said gearing, means for selectively connecting the movable element of the motor to a movable element of the gearing so as to shift the gearing alternately from one speed ratio to another, and means for controlling the selectively connecting means by the accelerator mechanism prior to operation of the motor so that one speed ratio can be selected only when the accelerator mechanism is in released condition and the other speed ratio selected only when the accelerator mechanism is in a fully depressed condition.

31. In a motor vehicle provided with an accelerator mechanism and a change speed gearing, means comprising a fluid motor for shifting a single movable element of said gearing, means for selectively connecting the movable element of the motor to a movable element of the gearing so as to shift the gearing alternately from one speed ratio to another, means for controlling the selectively connecting means by the accelerator mechanism prior to operation of the motor so that one speed ratio can be selected only when the accelerator mechanism is in released condition and the other speed ratio selected only when the accelerator mechanism is in a fully depressed condition, a valve for controlling operation of the fluid motor, and means for opening said valve after the selective connection is made and when the accelerator mechanism is in either a released or a fully depressed condition.

32. In a motor vehicle provided with an accelerator mechanism and a change speed gearing, means comprising a fluid motor for shifting a single movable element of said gearing, means for selectively connecting the movable element of the motor to a movable element of the gearing so as to shift the gearing alternately from one speed ratio to another, means for controlling the selectively connecting means by the accelerator mechanism prior to operation of the motor so that one speed ratio can be obtained only when the accelerator mechanism is in one predetermined position and the other speed ratio obtained only when the accelerator mechanism is in another predetermined position, means for causing the fluid motor to operate including a valve, and control means for placing said valve in an operative position after the selective connection is made and when the accelerator mechanism is in either of its said predetermined positions.

33. In a motor vehicle provided with an accelerator mechanism and a change speed gearing, means comprising a fluid motor for shifting said gearing, means for selectively connecting the movable element of the motor to a movable element of the gearing so as to shift the gearing alternately from one speed ratio to another, means for operating the selectively connecting means by the accelerator mechanism so that one speed ratio can be obtained when the accelerator mechanism is in one predetermined position and the other speed ratio obtained when the accelerator mechanism is in another predetermined position, means for causing the fluid motor to operate including a valve, a solenoid for opening the valve, parallel electrical circuits for the solenoid, means comprising a switch in each circuit for controlling it, and means for closing one switch when the accelerator mechanism is in one predetermined position and the other switch when the accelerator mechanism is in the other predetermined position.

34. In a motor vehicle provided with an accelerator mechanism, a main clutch mechanism and a change speed gearing having at least two speed ratios; means comprising a single fluid motor for disengaging the clutch and subsequently shifting said gearing, means for selectively connecting the movable element of the single motor to a movable element of the gearing so as to shift the gearing alternately from one speed ratio to another, means for controlling the selectively connecting means by the accelerator mechanism so that the highest speed ratio can be selected only when the accelerator mechanism is in released condition and the other speed ratio selected only when the accelerator mechanism is in a fully depressed condition, and means for causing the fluid motor to be operated including a control valve and means for opening the control valve only when the accelerator mechanism is in released or fully depressed condition.

35. In a motor vehicle provided with an accelerator mechanism and a change speed gearing having a shiftable element movable in opposite directions for obtaining two speed ratios, means comprising a fluid motor for shifting said element in opposite directions, a rotatable member connected to the shiftable element so as to move said element in one direction when rotated in one direction and to move the shiftable element in the opposite direction when rotated in the opposite direction, means for connecting the movable element of the fluid motor to opposite sides of the axis of the rotatable member, and means operable by the accelerator mechanism for determining to which side of the axis of the rotatable member the movable element will be connected.

36. In a motor vehicle provided with an accelerator mechanism and a change speed gearing having a shiftable element movable in opposite directions for obtaining two speed ratios, means comprising a fluid motor for shifting said element in opposite directions, a rotatable member connected to the shiftable element so as to move said element in one direction when rotated in one direction and to move the shiftable element in the opposite direction when rotated in the opposite direction, means for connecting the movable element of the fluid motor to opposite sides of the axis of the rotatable member, and means operable by the accelerator mechanism when in released condition for causing the movable element of the fluid motor to be connected to one side of the axis of the rotatable member and when in fully depressed condition for causing the said movable element to be connected to the other side of the axis of the rotatable member.

37. In a motor vehicle provided with an accelerator mechanism, a main clutch and a change speed gearing, means comprising fluid motor having a movable member movable in one direction for causing the clutch to be disengaged and a single movable element of the gearing to be shifted from one speed ratio to another, and means comprising a control valve for so controlling said fluid motor by the accelerator mechanism that the clutch will be disengaged and a shift will be made to the highest speed ratio if the gearing is in another speed ratio when the accelerator mechanism is in released position and the clutch will be disengaged and a shift will be made to a lower speed ratio if the gearing is in said highest speed ratio when the accelerator mechanism is in a depressed position beyond its engine controlling range.

38. In a motor vehicle provided with an accelerator mechanism, a main clutch and a change speed gearing, means comprising a single movable member for causing the clutch to be disengaged and the gearing to be shifted, means for so controlling said last named means by the accelerator mechanism that a shift will be made to one speed ratio if the gearing is in another speed ratio when the accelerator mechanism is in released position and a shift will be made to another speed ratio if the gearing is in said one speed ratio when the accelerator mechanism is in a depressed position beyond its engine controlling range, and manually controlled means for placing said gearing in neutral condition at will by manual effort.

39. In a motor vehicle provided with an accelerator mechanism, a main clutch and a change speed gearing, means comprising a fluid motor having a movable element for causing the clutch to be disengaged and an element of the gearing to be shifted from one speed ratio to another, a control valve for the fluid motor, means for controlling the control valve and causing disengagement of the clutch and a shift to be made to one speed ratio only when the accelerator mechanism is placed in one position, and means for controlling the control valve and causing disengagement of the clutch and a shift to be made to another speed ratio only when the accelerator mechanism is in a predetermined different position.

40. In a motor vehicle provided with an accelerator mechanism, a main clutch and a change speed gearing, means comprising a fluid motor having a movable element for causing the clutch to be disengaged and the gearing to be shifted, a control valve for the fluid motor, means for controlling the control valve and causing disengagement of the clutch and a shift to be made to one speed ratio when the accelerator mechanism is placed in one position, means for controlling the control valve and causing disengagement of the clutch and a shift to be made to another speed ratio when the accelerator mechanism is in a different position, and means controlled by the accelerator mechanism for causing the rate of re-engagement of the clutch to be controlled.

41. In a motor vehicle provided with a main clutch and a change speed gearing, means comprising control means and a fluid motor for causing the clutch to be disengaged and the gearing to be alternately placed in two different speed ratios at the will of the operator, manual means comprising a member movable from one position to another position to condition said control means for operation, means operable by said manual means when returned to said one position for manually neutralizing the gearing, and means operable when said manual means is returned to said one position for automatically permitting re-engagement of the clutch and when again returned to the control means conditioning position for automatically causing the disengagement of the clutch and re-establishment of the operative condition of the gearing which existed prior to the gearing being neutralized by the manual means.

42. In a motor vehicle provided with an accelerator mechanism, a main clutch and a change speed gearing, means comprising a fluid motor and control means for causing the clutch to be disengaged and the gearing to be placed in one speed ratio condition when the accelerator mechanism is in one position and for causing the clutch to be disengaged and the gearing to be placed in another speed ratio condition when the accelerator mechanism is in a different position, manually-controlled means for placing the gearing in neutral position at will, means operative when the accelerator mechanism is in one of said shifting positions for causing the fluid motor to automatically permit reengagement of the clutch when said manually-controlled means neutralizes the gearing, and means operable when said manually-controlled means is returned to its position corresponding to an operative condition of the gearing for causing the fluid motor to automatically disengage the clutch and re-establish the operative condition of the gearing as determined by said one position of the accelerator mechanism.

43. In a motor vehicle provided with an accelerator mechanism, a main clutch and a change speed gearing, means comprising a fluid motor and control means for causing the clutch to be disengaged and the gearing to be placed in one speed ratio condition when the accelerator mechanism is in its fully released position and for causing the clutch to be disengaged and the gearing to be placed in another speed ratio position when the accelerator mechanism is in a different position, manually-controlled means for placing the gearing in neutral position at will, and means operable when the accelerator mechanism is in said fully released position for causing the fluid motor to automatically permit re-engagement of the clutch when said manually-controlled means neutralizes the gearing and for automatically causing disengagement of the clutch and re-establishment of the operative condition of the gearing determined by said fully released position of the accelerator mechanism when the manually-controlled means is returned to its position corresponding to the operative condition of the gearing.

44. In a motor vehicle provided with an accelerator mechanism, a main clutch and a change speed gearing, means comprising a single movable member for causing the clutch to be disengaged and the gearing to be shifted from one operative position to another, means associated with the last named means and comprising selecting means controllable by the accelerator mechanism independently of the speed of the vehicle for automatically causing alternate shifting between two speed ratios by successive operations of the single member, and means comprising the accelerator mechanism and a manually-operated member for controlling the operation of the single movable member, said last named means being conditioned to cause operation of the single movable member by the actuation of the manually-operated member when the accelerator mechanism is in released position.

45. In a motor vehicle provided with an accelerator mechanism, a main clutch and a change speed gearing, means comprising a single movable member for causing the clutch to be disengaged and the gearing to be shifted, means associated with the last named means comprising selecting means controllable by the accelerator mechanism independently of the speed of the vehicle for automatically causing alternate shifting between the two speed ratios by successive operations of the single member, means comprising the accelerator mechanism and a manually-operated member for controlling the operation of the single movable member, said last named means being conditioned to cause operation of the single movable member by the actuation of the manually-operated member when the accelerator mechanism is in released position, and other manually-controlled means for placing said gearing in neutral condition at will by manual effort only.

46. In a motor vehicle provided with an accelerator mechanism, a main clutch and a change speed gearing, means comprising a single movable member for causing the clutch to be disengaged and the gearing to be shifted, means associated with the last named means comprising selecting means controllable by the accelerator mechanism independently of the speed of the vehicle for causing the lower of two speed ratios to be made active when an initial shift is made by movement of the single member and then alternate shifting between the two speed ratios automatically by successive operations of the single member, and means comprising the accelerator mechanism and a manually-operated member for controlling the operation of the single movable member, said last named means being conditioned to cause operation of the movable member by actuation of the manually-operated member when the accelerator mechanism is in released position.

47. In a motor vehicle provided with an accelerator mechanism, a main clutch and a change speed gearing, means comprising a fluid motor having a movable member for causing the clutch to be disengaged and the gearing to be shifted, means associated with the last named means for causing alternate shifting between two speed ratios by successive operations of the fluid motor, means comprising the accelerator mechanism and a manually-operated member for controlling the operation of the fluid motor, said last named means being conditioned to cause operation of the fluid motor by the actuation of the manually-operated member when the accelerator mechanism is in released position, and means comprising manually-controlled means operable at will for disabling the fluid motor, permitting re-engagement of the clutch and for neutralizing the gearing.

48. In a motor vehicle provided with an accelerator mechanism, a main clutch and a change speed gearing, means comprising a single reciprocable member for causing the clutch to be disengaged and the gearing to be shifted, means associated with the last named means for causing alternate shifting between two speed ratios by successive operations in a single direction of the single member, means comprising the accelerator mechanism and a manually-operated member for controlling the operation of the single movable member, said last named means being conditioned to cause operation of the single movable member by the operation of the manually-operated member when the accelerator mechanism is in released position, and other means operable when the accelerator mechanism is in a depressed position for causing the first named means to be operated with the manually operated member in operative position and the gearing to be shifted to the lower speed ratio of said two speed ratios in the event the higher speed ratio is operative.

49. In a motor vehicle provided with a main clutch having a clutch pedal with a free range of movement before acting to disengage the clutch and a change speed gearing, means comprising a single power-operated means connected for first disengaging the main clutch and then establishing a gear ratio, control means for the power-operated means comprising a control element and means for conditioning the control element to cause operation of the power-operated means when the clutch pedal is moved to a position in its free range of movement, and means interconnecting the clutch pedal and the gearing after clutch-disengaging movement of the clutch pedal for permitting the transmitting of manual force by additional pedal movement to cause or assist in causing the establishment of the gear ratio by manual force in the event of total or partial failure of the power means to operate.

50. In a motor vehicle provided with an accelerator mechanism, with a main clutch and clutch operating pedal having a free range of movement before acting to disengage the clutch and with a change speed gearing, power-operated means for causing the clutch to be disengaged and a gear ratio to be established, control means for the power-operated means, and means for controlling the control means by the accelerator mechanism and the clutch pedal, said last named means being conditioned to cause the control means to initiate operation of the power means when the accelerator mechanism is in a predetermined position and the clutch pedal is moved to a position in its free range of movement.

51. In a motor vehicle provided with an accelerator mechanism, with a main clutch and clutch operating pedal having a free range of movement before acting to disengage the clutch and with a change speed gearing, power-operated means for causing the clutch to be disengaged and a gear ratio to be established, control means for the power-operated means, means for controlling the control means by the accelerator mechanism and the clutch pedal, said last named means being conditioned to cause the control means to initiate operation of the power means when the accelerator mechanism is in a predetermined position and the clutch pedal is moved to a position in its free range of movement, and means establishing a connection between the clutch pedal and the gearing for transmitting manual force to cause the gear ratio to be made operative in the event the power-operated means should totally or partially fail to operate, said connection being effective only when the clutch pedal is moved beyond the clutch-disengaging position.

52. In a motor vehicle provided with an accelerator mechanism and a change speed gearing having an element capable of assuming two speed ratio positions and a neutral position, means for shifting the element of said gearing alternately between one speed ratio and another, control means for said shifting means including said accelerator mechanism, manually-controlled means movable from one position to another position for conditioning the control means for operation, said control means causing the shifting means to place the element of the gearing in one speed ratio when the accelerator mechanism is in released condition and for causing the shifting means to place the element of the gearing in the other speed ratio when the accelerator mechanism is fully depressed, and means operable by the manually-controlled means when returned to the one position for first disabling the conditioning means and subsequently moving the element of said gearing to neutral position.

53. In a motor vehicle provided with an accelerator mechanism, a main clutch and a change speed gearing, means comprising a single power means having an element successively movable in one direction for disengaging the clutch and for shifting said gearing alternately between one speed ratio and another, said element when movable in the other direction permitting reengaging control of the clutch, control means for said power means including said accelerator mechanism, said control means causing the power means to disengage the clutch and place the gearing in one speed ratio when the accelerator mechanism is in released condition and for causing the power means to disengage the clutch and place the gearing in the other speed ratio when the accelerator mechanism is fully depressed, and means controlled by the accelerator mechanism for controlling the rate of reengagement of the clutch.

54. In a motor vehicle provided with an accelerator mechanism, a main clutch and a change speed gearing having an element capable of assuming two speed ratio positions and a neutral position, means including power means for disengaging the main clutch and for shifting the element of said gearing alternately between one speed ratio and another, control means for said power means including said accelerator mechanism, manually-controlled means movable from one position to another position for conditioning the control means for operation, said control means being operable to cause the power means to disengage the main clutch and place the gearing element in a speed ratio when the accelerator mechanism is in released condition to thereby permit the speed ratios to be alternately established by successively placing the accelerator mechanism in released position, and means operable by the manually controlled means when returned to the one position for moving the element of said gearing to neutral position.

55. In a motor vehicle provided with an accelerator mechanism, a main clutch and a change speed gearing having an element capable of assuming two speed ratio positions and a neutral position, means including power means for disengaging the main clutch and for shifting the element of said gearing alternately between one speed ratio and another, control means for said power means including said accelerator mechanism, manually-controlled means movable from one position to another position for conditioning the control means for operation, said control means being operable to cause the power means to disengage the main clutch and place the gearing element in a speed ratio when the accelerator mechanism is in released condition and to disable the power means and allow re-engaging of the main clutch when the accelerator mechanism is initially moved from its released position to thereby permit the speed ratios to be alternately established by successively placing the acceleration mechanism in released position, and means operable by the manually controlled means when returned to the one position for moving the element of said gearing to neutral position.

56. In a motor vehicle provided with an engine having an accelerator mechanism, with a main clutch and clutch operating pedal having a free range of movement before acting to disengage the clutch and with a change speed gearing having a hand control lever, power operated means connected for causing the clutch to be disengaged and a speed ratio to be established, control means for the power operated means, and means for controlling the control means by the accelerator mechanism, the hand control lever and the clutch pedal, said last named means being conditioned to cause the control means to initiate operation of the power operated means when the accelerator mechanism and the hand control lever are in predetermined positions and the clutch pedal is moved to a position in its free range of movement.

57. In a motor vehicle provided with an engine having an accelerator mechanism, with a main clutch and clutch operating pedal having a free range of movement before acting to disengage the clutch and with a change speed gearing having a hand control lever, power operated means connected for causing the clutch to be disengaged and a speed ratio to be established, control means for the power operated means, means for controlling the control means by the accelerator mechanism, the hand control lever and the clutch pedal, said last named means being conditioned to cause the control means to initiate operation of the power operated means when the accelerator mechanism is in a predetermined position, the hand control lever is moved from one predetermined position to a second predetermined position and the clutch pedal is moved to a position in its free range of movement, and means for neutralizing the gearing by manual effort and disabling the control means when the hand lever is returned to its said first predetermined position.

58. In a motor vehicle provided with an engine having an accelerator mechanism, with a main clutch and clutch operating pedal having a free range of movement before acting to disengage the clutch and with a change speed gearing having a hand control lever, a source of fluid pressure different from atmosphere, a fluid motor having a movable element connected for causing the clutch to be disengaged and a speed ratio established, conduit means between the source and the motor, a valve associated with the conduit means, means for conditioning said valve so that the fluid motor can operate when the hand control lever is moved from one predetermined position to another, said valve causing the fluid motor to be disabled when the hand control lever is in its first predetermined position, other valve means for controlling the fluid motor, and means for causing said other valve means to be opera-
tive when the accelerator mechanism is in a predetermined position and the clutch pedal is moved to a position in its free range of movement.

59. In a motor vehicle provided with an engine having an accelerator mechanism, with a main clutch and clutch operating pedal having a free range of movement before acting to disengage the clutch and with a change speed gearing having a hand control lever, a source of fluid pressure different from atmosphere, a fluid motor having a movable element connected for causing the clutch to be disengaged and a speed ratio established, conduit means between the source and the motor, a valve associated with the conduit means, means for conditioning said valve so that the fluid motor can operate when the hand control lever is moved from one predetermined position to another, said valve causing the fluid motor to be disabled when the hand control lever is in its first predetermined position, other valve means for controlling the fluid motor, means for causing said other valve means to be operative when the accelerator mechanism is in a predetermined position and the clutch pedal is moved to a position in its free range of movement, and means for neutralizing the gearing by manual effort when the hand control lever is returned to its first predetermined position.

60. In a control mechanism for a change speed gearing having a shiftable member movable to two gear ratio operative positions and a neutral position, power operated means having a movable element connectable to the shiftable member, control means for the power operated means, a manual member, means for conditioning the power operated means for operation when the manual member is moved from one position to a second position, spring means, means for energizing the spring means independently of power from the power operated means, means for so associating the spring means with the shiftable member that it can be effective to apply its force to move the shiftable member from a gear ratio operative position to the neutral position, and means operable when the manual member is moved from the second position back to the first position for disabling the power means and for releasing the spring means by manual effort so as to become effective to apply its force to move the shiftable member to its neutral position.

61. In a control mechanism for a change speed gearing having a shiftable member movable to two gear ratio operative positions and a neutral position, power operated means, a manual member, means for conditioning the power operated means for operation when the manual member is moved from one position to a second position, spring means, means for associating the spring means with the shiftable member so that it can be effective to apply its force to move the shiftable member from the gear ratio operative position to the neutral position, means for energizing said spring means and maintaining it energized independently of power from the power operated means when the manual member is moved to the second position, and means operable when the manual member is moved from the second position back to the first position for disabling the power means by the conditioning means and for releasing the energy of the spring so that it will become effective in applying its force to move the shiftable member to its neutral position.

62. In a control mechanism for a change speed gearing having a shiftable member movable to two gear ratio operative positions and a neutral position, a fluid motor having a movable element connectable to the shiftable member, a source of fluid pressure different from atmosphere and connected to operate the motor, control means including a control valve between the source and the motor, a conditioning valve also between the source and the motor, a manual member, means for placing the conditioning valve in a position to permit control of the operation of the motor by the control valve when the manual member is moved from one position to a second position, spring means, and means for so associating the spring means with the shiftable member that it can be effective to apply force to move the shiftable member from a gear ratio operative position to the neutral position, and means operable when the manual member is moved from the second position back to the first position for disabling the power means by placing the conditioning valve means in an inoperative position and for manually releasing the spring means to become effective in applying its force for moving the shiftable member to its neutral position.

63. In a motor vehicle provided with an accelerator mechanism and a change speed gearing having a member movable to two different speed ratio operative positions, a control mechanism comprising a fluid motor having a movable element, means including selecting means for so connecting the movable element to the movable member of the gearing that successive reciprocations of said element from one position to another and return will cause the movable member to alternately assume its operative positions, a source of pressure different from atmospheric pressure connected to one end only of the motor, a control valve, means causing said control valve to be open when the accelerator mechanism is in a released position and closed when said accelerator mechanism is in an operative position, means comprising a manually movable member settable in one position for conditioning the motor for operation and maintained in said position during ratio changing, and means for neutralizing the gearing at will by a return movement of the manual member from the said one position.

64. In a motor vehicle having an engine provided with a carburetor, an accelerator mechanism therefor and with a change speed gearing, a fluid motor for causing a speed ratio to be operative, means comprising a control valve for controlling the operation of said motor, means controlled by the accelerator mechanism for placing said valve in a fluid motor operative position when the accelerator mechanism is in a depressed position substantially at the end of its full operating range, an auxiliary valve means associated with the carburetor, and means for automatically closing the auxiliary valve whenever said accelerator mechanism is in said predetermined position whereby the control valve is caused to be in fluid motor operating position.

65. In a motor vehicle having an engine provided with a carburetor, an accelerator mechanism therefor and with a change speed gearing, a fluid motor for causing either of two different speed ratios to be operative, means comprising a control valve for controlling the operation of said motor, a solenoid for placing said valve in a fluid motor operating position, an electrical circuit for the solenoid including a switch, means operable by the accelerator mechanism for closing said switch and energizing the solenoid when the accelerator mechanism is fully depressed, an auxiliary valve means associated with the carburetor, means for automatically closing the auxiliary valve by the solenoid when it is energized, and other means for placing the control valve in fluid motor operating position independently of the circuit and solenoid when the accelerator mechanism is released.

66. In a motor vehicle provided with an accelerator mechanism, a main clutch and a change speed gearing, a fluid motor having a movable member, means operable by a single movement of the movable member in one direction for disengaging the clutch and for changing the speed ratio of the gearing, a source of pressure different from atmosphere for actuating the motor, a control valve, a solenoid for opening the control valve, an electrical circuit for the solenoid including an accelerator controlled switch which is adapted to be closed only when the accelerator mechanism is fully depressed, and means for preventing said switch from being closed by the accelerator mechanism notwithstanding it may be fully depressed.

67. In a motor vehicle provided with an accelerator mechanism, a main clutch and a change speed gearing, a fluid motor having a movable member, means operable by a single movement of the movable member in one direction for disengaging the clutch and for changing the speed ratio of the gearing, a source of pressure different from atmosphere for actuating the motor, a control valve, means for opening the valve when the accelerator mechanism is fully released or fully depressed, and means for preventing the valve from being opened notwithstanding the accelerator mechanism is fully depressed, said last named means being ineffective to prevent opening of the valve when the accelerator mechanism is fully released.

68. In a motor vehicle provided with an accelerator mechanism and a change speed gearing, means comprising a reciprocable member and connecting means between said member and gearing for shifting said gearing from one speed ratio to another, and means associated with the connecting means of the shifting means and controlled by the accelerator mechanism prior to operation of the shifting means for selecting the speed ratio to which the gearing is shifted, said selecting means comprising a single rotatable cam member movable to two selecting positions and controllable to one position for selecting one speed ratio when the accelerator mechanism is in a released position and controllable to the other position for selecting the other speed ratio when the accelerator mechanism is moved to a position substantially at the end of its operating range remote from the released position.

69. In a motor vehicle provided with an accelerator mechanism and a change speed gearing, means for shifting said gearing from one speed ratio to another, and selecting means for the shifting means comprising a single rotatable V-shaped cam member so controlled by the accelerator mechanism prior to operation of the shifting means that it will be rotated to one position and one speed ratio will be selected when the accelerator mechanism is in released condition and it will be rotated to another position and another speed ratio will be selected when the accelerator mechanism is in depressed condition substantially at the end of its operative range.

70. In a motor vehicle provided with an accelerator mechanism and a change speed gearing, means for shifting said gearing from one speed ratio to another, selecting means comprising a single rotatable V-shaped cam member for the shifting means so controlled by the accelerator mechanism prior to operation of the shifting means that it will be rotated to one position and one speed ratio will be selected when the accelerator mechanism is in released condition and it will be rotated to another position and another speed ratio will be selected when the accelerator mechanism is in depressed condition substantially at the end of its operative range, and means for causing said shifting means to be operated only when the accelerator mechanism is in the released or in the depressed condition.

71. In a motor vehicle provided with an accelerator mechanism and a change speed gearing having at least two speed ratios, means for shifting said gearing from one speed ratio to another, and selecting means comprising a single rotatable V-shaped selecting cam member for the shifting means so directly controlled by the accelerator mechanism prior to operation of the shifting means that the selecting member will be moved to one position and the highest speed ratio will be selected when the accelerator mechanism is in one position and the selecting member will be moved to another position and the other speed ratio will be selected when the accelerator mechanism is in another position.

72. In a motor vehicle provided with an accelerator mechanism, a main clutch and a change speed gearing, a single fluid motor for causing the clutch to be disengaged and a single element of the gearing to be shifted, and means comprising a control valve and selecting means for so controlling said fluid motor by the accelerator mechanism that the clutch will be disengaged and a shift will be made to one speed ratio if the gearing is in another speed ratio when the accelerator mechanism is in released position only and the clutch will be disengaged and a shift will be made to another speed ratio if the gearing is in said one speed ratio only when the accelerator mechanism is in a depressed position.

73. In combination with a change speed gearing having a movable member for establishing either of two speed ratios by movement to two positions through a neutral position, a fluid motor having a movable element movable to one position and return, means for connecting the element to the movable member including selecting means so associated with the movable element and the member that a movement of the element in one direction will establish one speed ratio and set the selecting means so that a succeeding movement of the element in the same direction will establish the other speed ratio, a source of pressure different from atmosphere, conduit means between the source and the motor, a manually operative member, conditioning valve means in the conduit means, means for placing the conditioning valve means in a conditioning position when the manual member is moved from one position to another position, means operable by the manual member when returned to its said one position for first placing the conditioning valve means in a non-conditioning position and thereby effect the return movement of the movable element of the motor from its speed ratio establishing position and then subsequently causing by manual effort the neutralizing of an established speed ratio.

74. In a motor vehicle provided with an accelerator mechanism, a main clutch and a change speed gearing, a power means connected to disengage the clutch, mechanical connecting means between the power means and the gearing including selecting means for determining which of two speed ratios will be established when the power means is operated, means for controlling the power means and actuating the selecting means by the accelerator mechanism so as to cause the clutch to be disengaged and one speed ratio estab'ished when the accelerator mechanism is placed in one position and the clutch to be disengaged and the other speed ratio to be established when the accelerator mechanism is placed in another position, and means actuated by movement of the accelerator mechanism after a speed ratio has been established for controlling the rate of re-engagement of the clutch.

75. In a motor vehicle provided with an accelerator mechanism and a change speed gearing having at least two speed ratios, power means comprising a reciprocable actuating member for shifting the gearing, means comprising selecting means between the reciprocable actuating member and the gearing and operable for determining which speed ratio will be established by movement of the actuating member in one direction only of its reciprocable movement, means for controlling the operation of the selecting means by the actuating member during a shift of the gearing, and means for so controlling the operation of the power means by the accelerator mechanism such that the power means will be caused to reciprocate its actuating member to thereby effect selective establishment of the speed ratios when the accelerator mechanism is placed in its released position only.

76. In a motor vehicle provided with an accelerator mechanism, a main clutch and a change speed gearing having at least two speed ratios, power means comprising a reciprocable actuating member for first disengaging the clutch and then shifting the gearing, means comprising selecting means between the reciprocable actuating member and the gearing and operable for determining which speed ratio will be established by movement of the actuating member in one direction only of its reciprocable movement, means for controlling the operation of the selecting means by the actuating member during a shift of the gearing, and means for controlling the operation of the power means by the accelerator mechanism such that the power means will be caused to reciprocate its actuating member to thereby effect disengagement of the clutch and selective establishment of the speed ratios when the accelerator mechanism is placed in its released position only.

GLENN T. RANDOL.

REFERENCES CITED

The following references are of record in the file of this patent:

UNITED STATES PATENTS

| Number | Name | Date |
|---|---|---|
| 1,495,274 | Teetor | Mar. 27, 1924 |
| 1,755,595 | Craig | Apr. 22, 1930 |
| 1,820,269 | Craig | Aug. 25, 1931 |
| 1,823,590 | Christensen | Sept. 15, 1931 |
| 1,993,544 | Fleischel | Mar. 5, 1935 |
| 2,047,807 | Tenney et al. | July 14, 1936 |
| 2,051,113 | Tyler | Aug. 18, 1936 |
| 2,051,553 | Fleischel | Aug. 18, 1936 |
| 2,068,716 | Tenney et al. | Jan. 26, 1937 |

(Other references on following page)

UNITED STATES PATENTS

| Number | Name | Date |
|---|---|---|
| 2,092,446 | Fleischel | Sept. 7, 1937 |
| 2,103,540 | Livermore | Dec. 28, 1937 |
| 2,104,608 | Cox et al. | Jan. 4, 1938 |
| 2,109,615 | Durham | Mar. 1, 1938 |
| 2,115,097 | Durham | Apr. 26, 1938 |
| 2,123,298 | Bollinger et al. | July 12, 1938 |
| 2,126,032 | Randol | Aug. 9, 1938 |
| 2,126,033 | Randol | Aug. 9, 1938 |
| 2,163,880 | Houston et al. | June 27, 1938 |
| 2,169,216 | Bloxsom | Aug. 15, 1939 |
| 2,208,828 | Adams | July 23, 1940 |
| 2,210,237 | Fuhrer | Aug. 6, 1940 |
| 2,212,282 | Van Buskirk | Aug. 20, 1940 |
| 2,222,913 | Pescara | Nov. 26, 1940 |
| 2,225,493 | Barnes | Dec. 17, 1940 |
| 2,238,746 | Neracher et al. | Apr. 15, 1941 |
| 2,244,092 | Wheeler | June 3, 1941 |
| 2,250,835 | Kliesrath et al. | July 29, 1941 |
| 2,257,511 | Neff | Sept. 30, 1941 |
| 2,263,400 | Schwarz | Nov. 18, 1941 |
| 2,266,598 | Hale | Dec. 16, 1941 |
| 2,273,277 | Leukhardt | Feb. 17, 1942 |
| 2,281,159 | Kliesrath et al. | Apr. 28, 1942 |
| 2,322,479 | Schjolin | June 22, 1943 |
| 2,325,486 | Derungs | July 27, 1943 |
| 2,327,063 | Randol | Aug. 17, 1943 |
| 2,328,921 | Neff | Sept. 7, 1943 |
| 2,332,341 | Price et al. | Oct. 19, 1943 |

FOREIGN PATENTS

| Number | Country | Date |
|---|---|---|
| 468,422 | Great Britain | Sept. 28, 1935 |
| 457,269 | Great Britain | Nov. 24, 1936 |
| 696,226 | Germany | Sept. 14, 1940 |

OTHER REFERENCES

Article on Chrysler Automatic Drive, published in Product Engineering, pp. 466–469 for October 1940.